United States Patent
Redfern

(10) Patent No.: US 11,401,956 B2
(45) Date of Patent: Aug. 2, 2022

(54) APPARATUS FOR SUPPORTING AN EXPLOSIVE DEVICE

(71) Applicant: MGW ENGINEERING PTY LTD, Orange (AU)

(72) Inventor: Anthony Redfern, Orange (AU)

(73) Assignee: MGW ENGINEERING PTY LTD, New South Wales (AU)

( * ) Notice: Subject to any disclaimer, the term of this patent is extended or adjusted under 35 U.S.C. 154(b) by 634 days.

(21) Appl. No.: 16/327,797

(22) PCT Filed: Aug. 30, 2017

(86) PCT No.: PCT/AU2017/050924
§ 371 (c)(1),
(2) Date: May 2, 2019

(87) PCT Pub. No.: WO2018/039718
PCT Pub. Date: Mar. 8, 2018

(65) Prior Publication Data
US 2019/0353186 A1 Nov. 21, 2019

(30) Foreign Application Priority Data
Sep. 2, 2016 (AU) ................ 2016222477

(51) Int. Cl.
*F15B 15/16* (2006.01)
*F42D 1/22* (2006.01)
(Continued)

(52) U.S. Cl.
CPC .......... *F15B 15/16* (2013.01); *F15B 15/1409* (2013.01); *F15B 15/1452* (2013.01);
(Continued)

(58) Field of Classification Search
CPC .............. F15B 15/1409; F15B 15/1452; F15B 15/1461; F15B 15/16; F15B 15/202; F42D 1/10; F42D 1/22; F42D 3/04; F42D 5/06
(Continued)

(56) References Cited

U.S. PATENT DOCUMENTS 3,427,051 A    2/1969  White et al.
3,749,297 A *  7/1973  Williams ................. F42D 1/10
                                              242/615.1
(Continued)

FOREIGN PATENT DOCUMENTS

CL       49836 B      3/2014
CL       56027 B      5/2018
(Continued)

OTHER PUBLICATIONS

PCT International Search Report and Written Opinion, PCT Application No. PCT/AU2017/050924, dated Oct. 31, 2017, 16 pages.
(Continued)

*Primary Examiner* — Michael Leslie
*Assistant Examiner* — Matthew Wiblin
(74) *Attorney, Agent, or Firm* — Fenwick & West LLP

(57) ABSTRACT

An apparatus (1) for supporting an explosive device (13) including a base member (3), one or more support members (11) and a fluid aperture (19). The base member (3) includes a base member aperture (5) to provide a passage (7) to a base chamber (9) of the base member (3). The one or more support members (11) are telescopically receivable through the base member aperture (5) and into the base chamber (9), wherein the one or more support members (11) support the explosive device (13). The fluid aperture (19) allows pressurised fluid into the base chamber (9) to force the one or more support members (11) towards an extended configu-
(Continued)

ration (23) such that at least part of the one or more support members (11) are telescopically extended out of the base chamber (9).

18 Claims, 17 Drawing Sheets

(51) Int. Cl.
  *F42D 3/04* (2006.01)
  *F15B 15/20* (2006.01)
  *F15B 15/14* (2006.01)
  *F42D 1/10* (2006.01)
  *F42D 5/06* (2006.01)

(52) U.S. Cl.
  CPC ........ *F15B 15/1461* (2013.01); *F15B 15/202* (2013.01); *F42D 1/10* (2013.01); *F42D 1/22* (2013.01); *F42D 3/04* (2013.01); *F42D 5/06* (2013.01)

(58) Field of Classification Search
  USPC ........................................ 102/313, 319, 321
  See application file for complete search history.

(56) References Cited

U.S. PATENT DOCUMENTS

| | | | |
|---|---|---|---|
| 3,964,265 A * | 6/1976 | Jamison | E21C 27/00 405/294 |
| 4,466,354 A | 8/1984 | Jelberyd et al. | |
| 4,522,129 A | 6/1985 | Jerberyd | |
| 4,523,512 A * | 6/1985 | Hessel | F15B 15/16 91/168 |
| 4,834,131 A | 5/1989 | Austin | |
| 5,921,718 A | 7/1999 | Kolk | |
| 5,957,540 A * | 9/1999 | Tremblay | F42D 3/04 299/13 |
| 6,209,440 B1 * | 4/2001 | Dannehl | E21D 15/44 91/168 |
| 6,318,272 B1 | 11/2001 | Mey | |
| 6,615,705 B2 * | 9/2003 | Reinelt | E21D 15/15 91/169 |
| 6,672,673 B1 | 1/2004 | Miller et al. | |
| 2004/0007911 A1 | 1/2004 | Smith | |
| 2009/0293753 A1 | 12/2009 | Grundlingh | |
| 2013/0145950 A1 | 6/2013 | Leppanen | |
| 2014/0150907 A1 | 6/2014 | Smith, III | |
| 2015/0175393 A1 * | 6/2015 | Poke | B66F 3/25 254/92 |
| 2016/0208609 A1 | 7/2016 | Healy | |
| 2017/0241758 A1 * | 8/2017 | Vicuna Marin | B25J 15/10 |
| 2018/0328387 A1 * | 11/2018 | Landberg | B66C 23/708 |

FOREIGN PATENT DOCUMENTS

| | | | |
|---|---|---|---|
| CN | 104591014 A * | 5/2015 | |
| DE | 20 2007 004100 U1 | 5/2007 | |
| FR | 1279770 A * | 12/1961 | ............... F42D 1/10 |
| GB | 716022 A | 9/1954 | |
| GB | 1044201 A | 9/1966 | |
| RU | 94028826 A | 6/1996 | |
| SE | 388934 B | 10/1976 | |
| SU | 984939 A1 | 12/1982 | |
| WO | WO 2015/127545 A1 | 9/2015 | |

OTHER PUBLICATIONS

Chilean Patent Office, Search Report, CL Patent Application No. 201900522, dated Feb. 11, 2020, nine pages.
European Patent Office, Extended European Search Report and Opinion, EP Patent Application No. 17844680.3, dated Mar. 2, 2020, seven pages.
European Patent Office, Office Action, EP Patent Application No. 17844680.3, dated Nov. 19, 2020, five pages.
Russian Patent Office, Search Report, RU Patent Application No. 2019108874/03, dated Oct. 7, 2020, five pages.
European Patent Office, Office Action, EP Patent Application No. 17844680.3, dated Mar. 11, 2021, five pages.

* cited by examiner

APPARATUS FOR SUPPORTING AN EXPLOSIVE DEVICE

TECHNICAL FIELD

The present disclosure relates to an apparatus and method for positioning and supporting an explosive device. The present disclosure may have application to a mine where explosive devices are used to break rock and ore.

BACKGROUND

In mining operations, explosives may be used to break up rock and ore. A method of underground mining includes block caving. In this method, a series of large rock funnels (known as "drawbells") are created below a deposit of ore. The rock funnels, via a raise, lead to haulage tunnels accessible by mining vehicles.

During production, broken ore above the funnels are channelled through the funnels, and raises, so that they can be collected in locations below the funnel by mining vehicles, such as front end loaders. This type of mining requires ore to be broken up such that it can freely flow through the narrowing choke of the funnel. In some circumstances, the ore may have physical characteristics such that it is broken by the weight and pressure of the ore. In some circumstances, it may be necessary to fracture the rock into smaller pieces with external pressure such as by hydraulic fracturing or with explosives.

The deposit of ore may include large boulders and these may get caught in the funnel and/or raises (in a situation known as "hang-up"/"hung-up"). This prevents further flow of ore through the funnel. This can be dangerous situation to rectify as blasting or hydraulic breaking may be required to break large boulders and/or dislodge the ore. In particular, it is dangerous for personnel to be in the area below a funnel thereby making it difficult to rectify the situation.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

An apparatus for supporting an explosive device comprising:

a base member comprising a base member aperture to provide a passage to a base chamber of the base member;

one or more support members telescopically receivable through the base member aperture and into the base chamber, wherein the one or more support members support the explosive device; and a fluid aperture to allow pressurised fluid into the base chamber to force the one or more support members towards an extended configuration such that at least part of the one or more support members are telescopically extended out of the base chamber.

As the one or more support members move towards the extended configuration, the supported explosive device also moves. Therefore in some examples of use, the apparatus may be placed on a first surface of a mine, such as a floor. Pressurised fluid is then introduced into the base chamber to force the support members to extend towards a second surface, such as rock in an area above the floor. Accordingly, the supported explosive device is also moved towards the second surface. The extended configuration of the support members may allow the apparatus to be propped between the first and second surface, whilst the support members support the explosive device in place, proximal to the second surface. This may be advantageous in cases where it is difficult or dangerous for a person to access the area proximal to the second surface to place the explosive device.

The apparatus may further comprise a sealing element, wherein the sealing element forms a first seal between at least one of the support members and a wall of the base chamber to prevent or reduce leakage of pressurised fluid out of the base chamber.

In some examples, the sealing element may comprise a piston ring associated with at least one of the support members to form a seal between the at least one support member and a wall of the base chamber.

The apparatus may further comprise a valve associated with the fluid aperture, wherein the valve is configurable to inhibit flow of pressurised fluid out of the base chamber via the fluid aperture.

The apparatus may further comprise an interface at the base member, wherein the interface is selectively connectable to an interface head associated with a mining machine. The interface may comprise an extension having a socket with an internal thread to receive a threaded head of the interface head.

The apparatus may further comprise a fluid conduit to provide a fluid flow path between the fluid aperture and the interface, wherein pressurised fluid is introduced to the base chamber via the interface and fluid conduit. The fluid conduit may provide the fluid flow path to the socket of the interface.

In some examples, the valve may be provided in the flow path between the interface and the fluid aperture.

In the apparatus, the one or more support members may comprise:

a first support member comprising a first support aperture to provide a passage to a first support chamber of the first support member, wherein the first support chamber is fluidly connected to the base chamber; and a second support member telescopically receivable through the first support aperture and into the first support chamber, wherein the fluid aperture allows pressurised fluid into the base chamber and the first support chamber to force the first and second support members towards the extended configuration such that at least part of the second support member is telescopically extended out of the first support chamber and at least part of the first support member is telescopically extended out of the base chamber.

The apparatus may further comprise a support seal element, wherein the support seal element forms a second seal between the second support member and a wall of the first support chamber to prevent or reduce leakage of pressurised fluid out of the first support chamber.

In the apparatus one or more of the support members and the base members may comprise tubular members.

In the apparatus one or more of the support members and the base members are polymer members.

An apparatus according to any one of the preceding claims further comprising one or more additional members, wherein the additional members are telescopically receivable into the base chamber through a second base member aperture of the base member, wherein the pressurised fluid into the base chamber forces the one or more additional members towards a second extended configuration. In some examples, the second extended configuration of the one or more additional members is towards a direction opposite to the extended configuration of the one or more support members.

In some examples, the apparatus may further comprise an extension. The extension is located at the base member, or the one or more additional members. In use the extension is not pressurised by the pressurised fluid. The extension is structurally weaker that the base, support members, or additional members such that on excess pressure in the base chamber the extension compresses before structural failure of the base member, support members, or additional members.

An adaptor for connecting a mining machine to an apparatus, the adaptor comprising:

an elongated body having a machine coupler at a first end for coupling with the mining machine and an interface head at an opposite second end, wherein the interface head is selectively connectable to an interface of the apparatus described above; and a pressurised fluid passage to allow a flow of pressurised fluid from the machine coupler to an outlet at the interface head, to provide a flow of pressurised fluid to the interface of the connected apparatus.

In the adaptor, the interface head may comprise a threaded head.

In the adaptor, the elongated body may comprise:

a rigid hollow rod section; and a flexible hollow section extending from the rigid hollow rod section and proximal to the second end, wherein at least part of the pressurised fluid passage is formed in the rigid hollow rod section and the flexible hollow section.

The adaptor may further comprise a pressure release valve associated with the pressurised fluid passage, wherein the pressure release valve is configured to vent the pressurised fluid passage upon excessive pressure.

A method of positioning an explosive device between a first surface and a second surface comprising:

attaching the explosive device to one or more support members of the apparatus described above;

positioning the apparatus, with the one or more support members in a retracted configuration, at the first surface; and introducing pressurised fluid into the base chamber of the apparatus to force the one or more support members towards an extended configuration such that the one or more support members, with the explosive device, extend towards the second surface such that the apparatus is propped between the first surface and the second surface, and wherein the explosive device supported by the one or more support members is positioned proximal to the second surface.

The method may further comprise:

connecting the interface of the apparatus according to any one of claims 5 to 9 to an interface head associated with a mining machine;

wherein the step of positioning the apparatus at the first surface comprises positioning the apparatus with the interface head, and wherein after the step of introducing pressurised fluid into the base chamber of the apparatus to force the one or more of the support members to an extended configuration, the method comprises:

disconnecting the interface of the apparatus from the interface head associated with the mining machine; and moving the mining machine from a danger zone associated with the explosive device.

BRIEF DESCRIPTION OF DRAWINGS

Examples of the present disclosure will be described with reference to.

DESCRIPTION OF EMBODIMENTS

Overview

Figure 1:
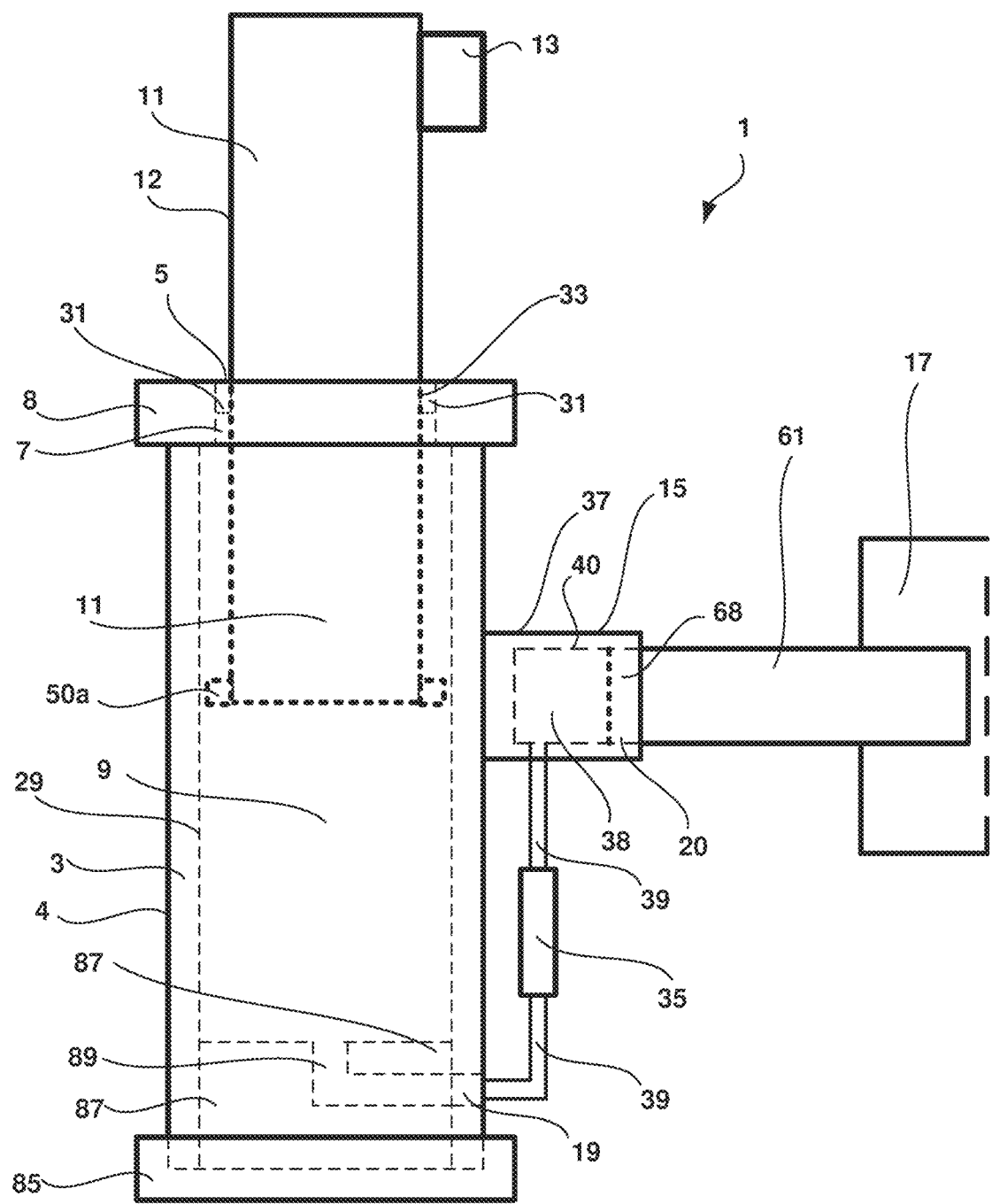
FIG. 1 is a side view of an example apparatus to support an explosive device, where the apparatus a single telescoping support member.

FIG. 1 illustrates an apparatus 1 for supporting an explosive device 13. The apparatus 1 includes a base member 3 and one or more support extendable members 11 to support the explosive device 13. The apparatus 1 may also move the explosive device 13 to a desired position and to support the explosive device 13 at the desired position.

Figure 5:
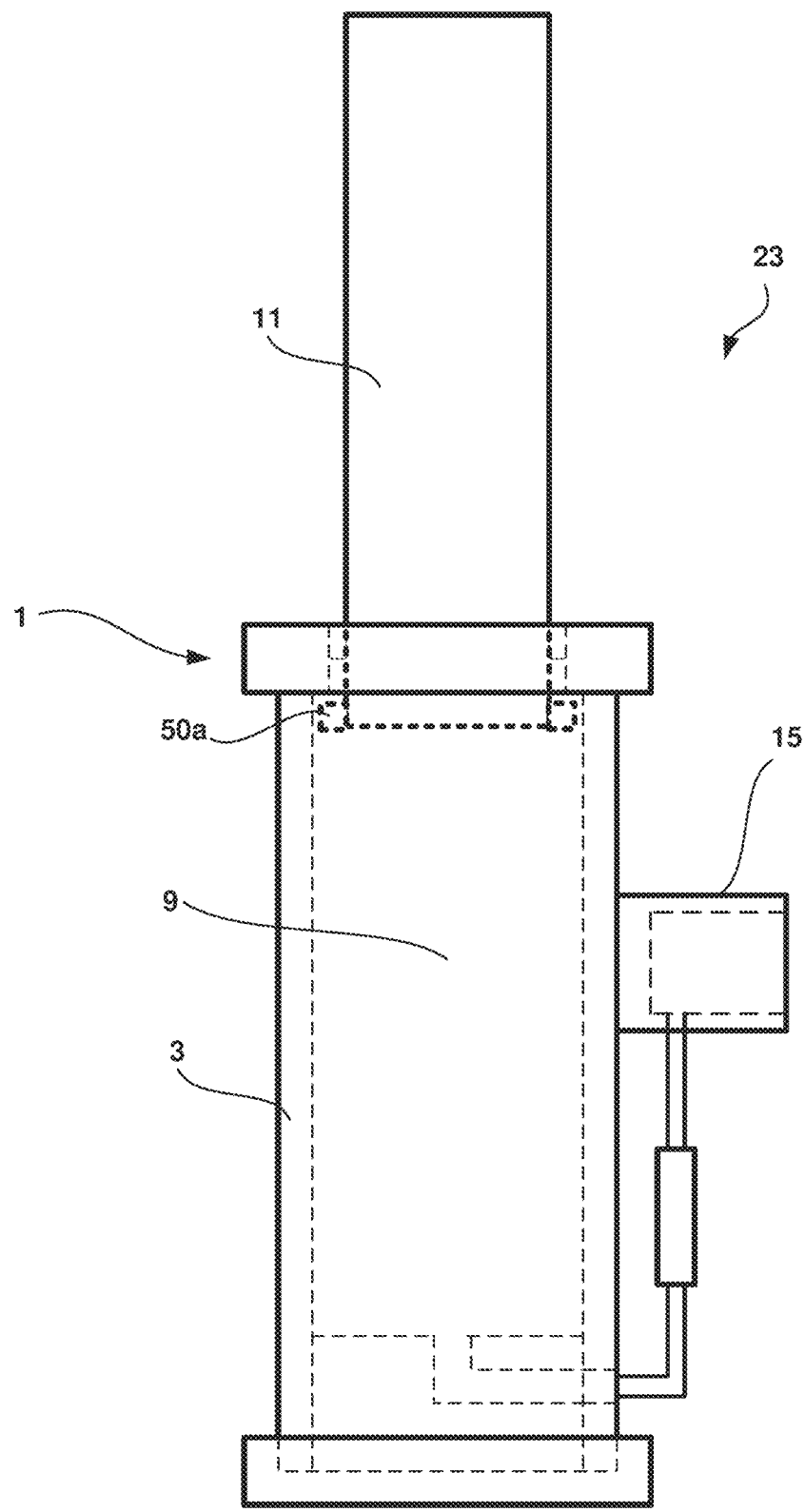
FIG. 5 is a side view of the apparatus of FIG. 1 with the support member in the extended configuration.

The base member 3 includes a base member aperture 5 to provide a passage 7 to a base chamber 9 of the base member 3. The one or more support members 11 are telescopically receivable through the base member aperture 5 and into the base chamber 9. To facilitate extending of the one or more support members 11, a fluid aperture 19 is provided to allow pressurised fluid into the base chamber 9 to force the one or more support members 11 towards an extended configuration 23 such that at least part of the one or more support members 11 are telescopically extended out of the base of the chamber 9 as shown in FIG. 5.

The apparatus 1 may also include an interface 15 at the base member 3, wherein the interface 15 is selectively connectable to an interface head 68 of a mining machine 17. While the apparatus 1 is connected to the interface head 68, the mining machine 17 can manoeuvre and place the apparatus 1 in a mine 200, and once the apparatus 1 is in position, the interface head 68 can disconnect from the apparatus 1 so that the mining machine 17 can withdraw from a blast area.

Figure 2:
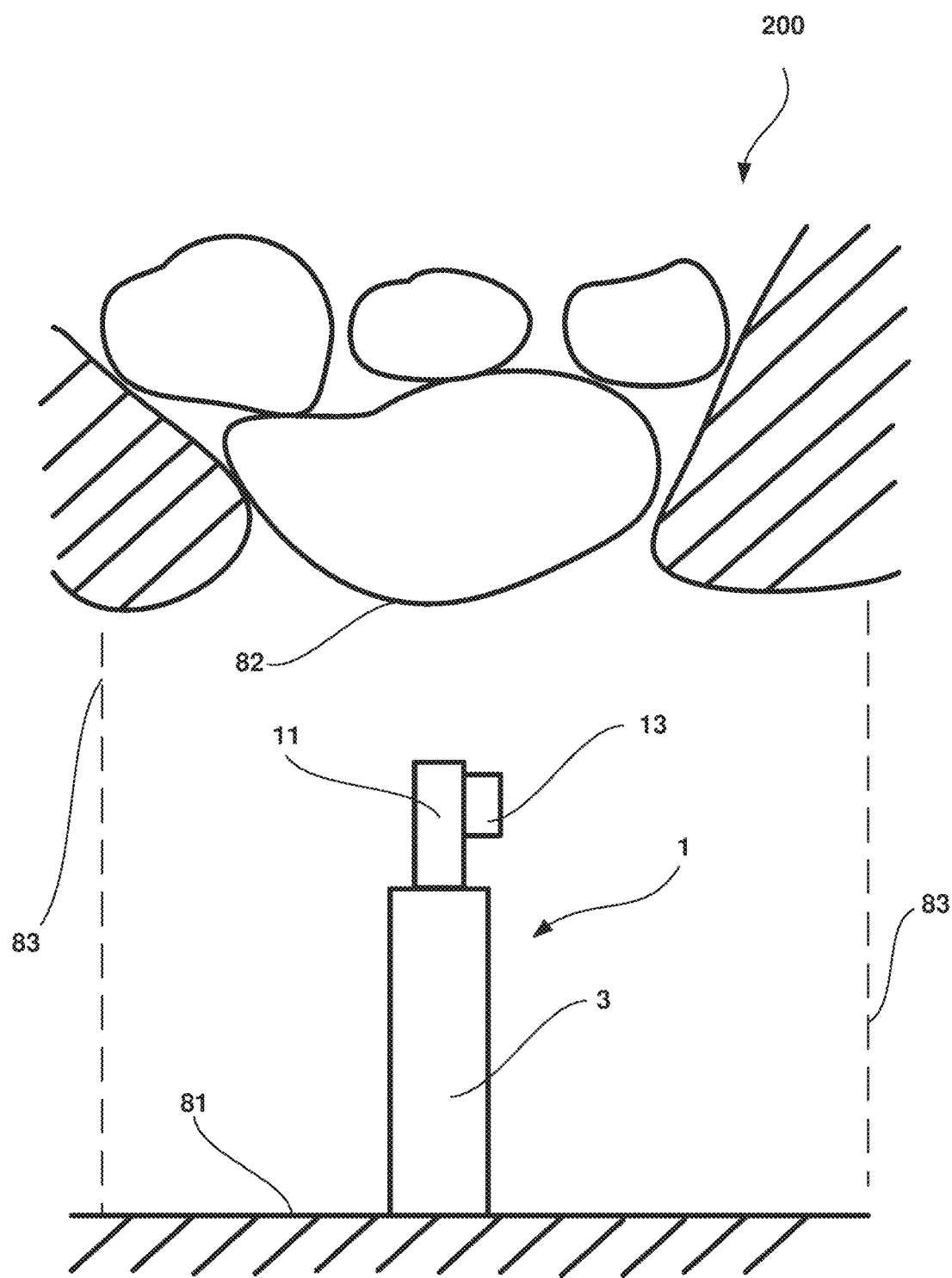
FIG. 2 is a view of part of a mine and the apparatus, whereby a support member of the apparatus is retracted.

FIG. 2 illustrates an underground mine 100, where the apparatus 1 may be used to support an explosive device 13. In this example, the underground mine includes a first surface 81, such as a floor, and a second surface 82, such as overlying rock. The overlying rock may be unstable (e.g. subject to collapse) and therefore the immediate area may be a danger zone 83. The danger zone 83 may also be defined by the area of expected blast and debris from detonation of the explosive device 13.

A simplified example of a method 200 of positioning and supporting the explosive device 13 will now be described. An explosive device 13 is attached to the support member 11 that is in the retracted configuration 21. In the retracted configuration 21, at least part of the one or more support members 11 are telescopically received in the base chamber 9 which may allow easy manoeuvring and placement of the apparatus in the underground mine 200. The apparatus 1 in a retracted configuration 21 is then positioned at the first surface 81. In this example, this includes positioning the apparatus 1 in a position below the desired position for the explosive device 13, such as second surface 82.

Figure 3:
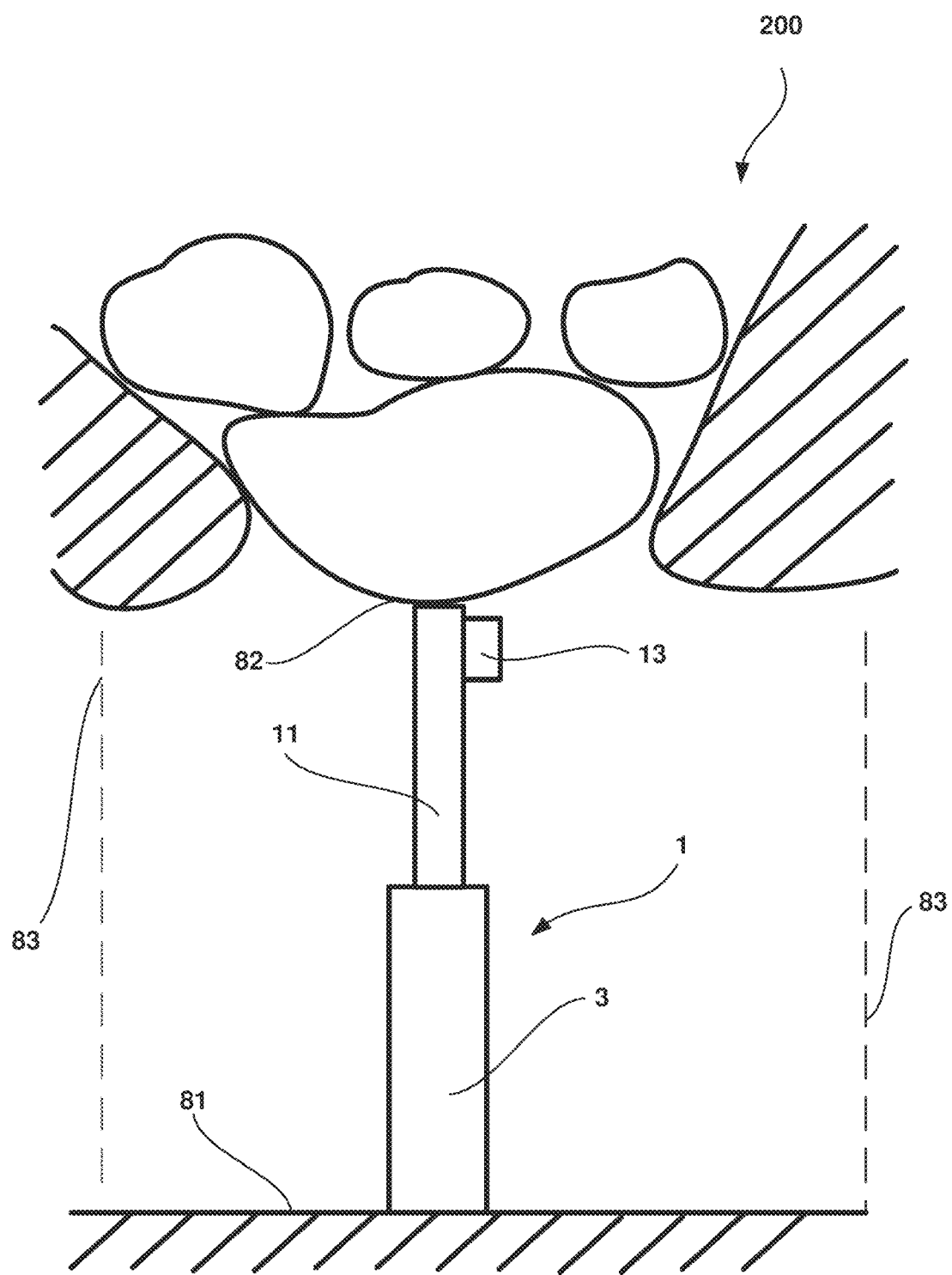
FIG. 3 is a view of part of the mine and the apparatus, whereby the support member of the apparatus is extended such that the apparatus is propped against two opposing surfaces of the mine.

Pressurised fluid is then introduced into the base chamber 9 to force the one or more support members 11 towards an extended configuration 23, such that the support members 11, with the explosive device 13, extend towards the second surface 82. As shown in FIG. 3, this causes the apparatus 1 to be propped between the first surface 81 and the second surface 82, wherein the explosive device 13 supported by the one or more support members 11 is positioned proximal to the second surface 82 (such as the desired position). In this position, the explosive device 13 is supported by the apparatus 1 until the explosive device 13 is detonated. An advantage of examples of this method 200 is that the explosive device 13 can be placed at the desired position whilst avoiding, or ameliorating, the danger of personnel working in the danger zone 83.

Detailed Example of the Apparatus 1

An example of the apparatus 1 will now be described in detail with reference to FIGS. 1 to 7.

Base Member 3

The base member 3 includes an elongated tube-like base body 4. The interior of the base body 4 may form, at least in part, the base chamber 9 that telescopically receives the one or more support members 11. In some examples, the base body 4 may be fabricated from pipe sections. This may include using polymer pipe such as polyvinyl chloride (PVC) pipe. An advantage of polymer construction is that polymers are light and less likely to form projectiles with high energy and momentum during an explosion. Further-more polymers are less likely to cause damage to crushers or other mining equipment during processing of the ore.

Referring to FIG. 1, at one end of the base member 3 is the base member aperture 5. The base member aperture 5, in this example, is formed in an end cap 8 that is fixed to an end of the base body 4. The end cap 8 may also include a sealing element 31, wherein the sealing element 31 forms a seal 33 between the at least one of the support members 11 and a wall 29 of the base chamber 9 to prevent or reduce leakage of pressurised fluid out of the base chamber 9. In some examples, the sealing element 31 may include an O-ring where an inner surface of the O-ring is in sliding contact with an outer surface of the support member 11. The O-ring may, in turn, be in sealing contact with the end cap 8 (that may, in turn be in sealed contact with the base chamber 9). For example, the end cap 8 may be glued to the base body 4, or in other examples the end cap 8 is threaded to the base body 4, and in yet further examples integrally formed with the base body 4. In alternative sealing arrangements, the O-ring may be in sealing contact directly with the wall 29 of the base chamber 9.

At the opposite end of the base member 3 is a base cap 85. The base cap 85 closes the lower portion of the tube-like base body 4 to define the lower portion of the base chamber 9. In some examples, the base cap 85 may be glued to the base body 8, threaded to the base body, or integrally formed with the base body. The base cap 85 in this example, in use, is in contact with the first surface 81. In some examples, the base cap 85 may include an outward surface to improve grip on the first surface 81, such as a textured surface, a rubberised surface, treaded surface, etc.

Although the base member 3 illustrated in FIGS. 1 to 13 may, in use, be positioned such that the base member is the lower portion of the apparatus and is in contact with the first surface 81 (i.e. the ground) it is to be appreciated that the apparatus is not limited to such a configuration in other examples. For example, in FIGS. 14 to 16b, the base member 3 is, in use, an intermediate member located between other components of the apparatus. Thus the term base is to be understood to be understood conceptually as a primary component in relation to other components of the apparatus and not limited to the lowest component.

The base member 3 may also include a bump stop 87 in a lower portion of the base chamber 9. The bump stop 87 may limit the lowest point that the one or more support members 11 can be telescopically received in the base chamber 9. In one example, a passage of the pressurised fluid through the fluid aperture 19 passes through the bump stop 87. For example, a flow path 89 may be provided in the bump stop 87 to allow pressurised fluid from the fluid aperture 19 to flow into the base chamber 9. In some alternatives, the bump stop 87 may include a porous material such that pressurised fluid can flow from the fluid aperture 19, through the porous bump stop 87, and into the base chamber 9.

An advantage of the configuration of the bump stop 87 and flow path 89 is that it may prevent, or reduce, the likelihood of the one or more support members 11 interfering with the flow of pressurised fluid through the fluid aperture 19 and into the base chamber 9. For example, say the fluid aperture 19 provided through a side wall of a tube-like base body 8, and where the base chamber 9 is substantially cylindrical. If the support member 11 has an outer circumference similar in dimensions to the base chamber 9, and the support member 11 is telescopically received into the base chamber 9, the support member 11 can overlap the fluid aperture 19. This may prevent the flow of pressurised fluid into the base chamber 9. Having the bump stop 87 prevents such blockages.

Support Member(s) 11

Figure 4:
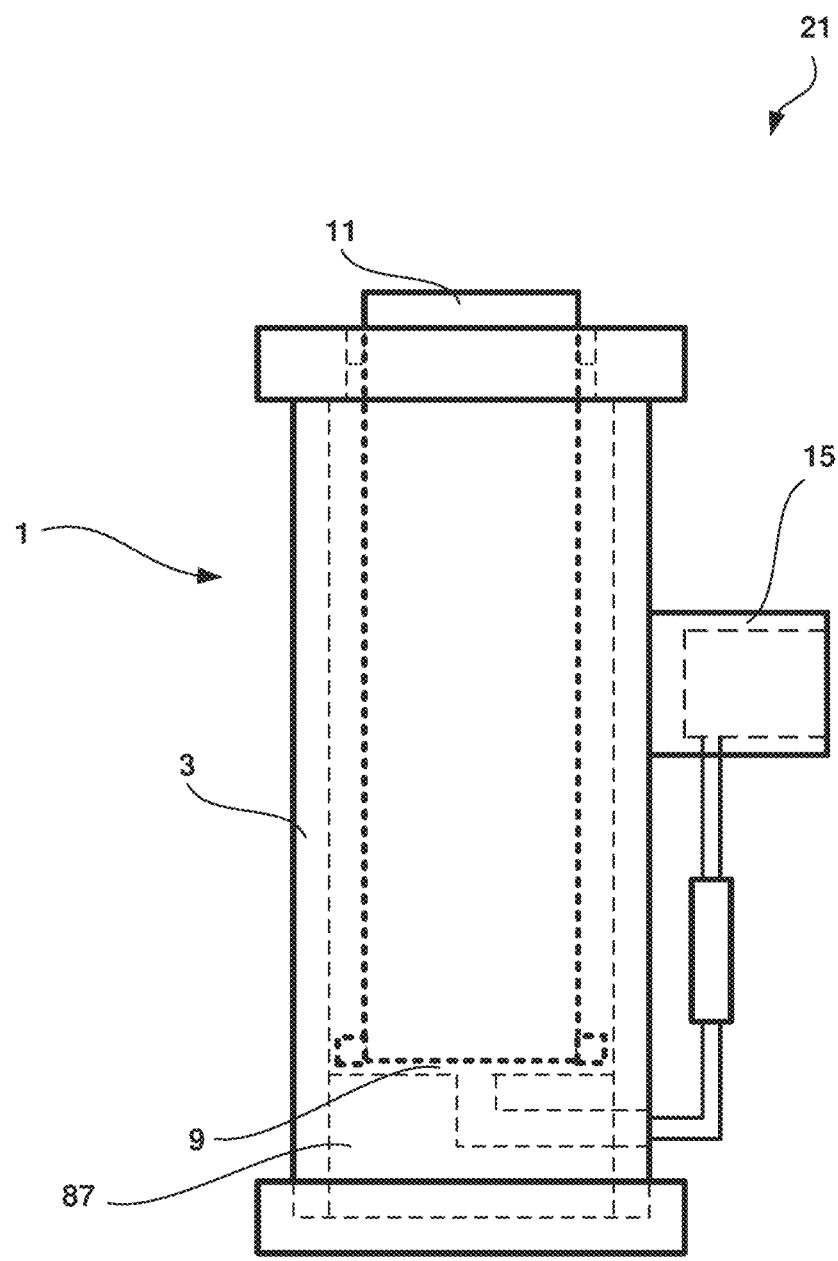
FIG. 4 is a side view of the apparatus of FIG. 1 with the support member in the retracted configuration.

The one or more support members 11 are telescopically received in the base member 3. When the support members 11 are in a retracted configuration 21 inside the base chamber 9 (as shown in FIG. 4) pressurised fluid can be introduced into the base chamber 9 to force the support members 11 out towards an extended configuration 23 (as shown in FIG. 5). Thus the at least one support member 11 may act like a pneumatic or hydraulic piston.

In some examples, the combination of the base member 3 and the one or more support members 11 form a telescopic cylinder, where the base member 3 is an outer main sleeve or "barrel". Receivable in the base member 3 are the one or more support members 11 that form the "stages" or inner sleeves of the telescopic cylinder. The final and smallest support member may form the "plunger" or "piston rod" of the telescopic cylinder.

Single Stage Support Member

The support members 11 may include an elongated tube-like (or cylindrical) support member body 12. In a single stage example, as shown in FIGS. 1 to 5, the support member body 12 may have an outer curved surface that has a curvature slightly smaller than the corresponding curvature of the wall 29 of the base chamber 29. This allows the support member body 12 of the support member 11 to be telescopically receivable into the base chamber 9 in the retracted configuration 21 as shown in FIG. 4.

When pressurised fluid is introduced into the base chamber 9, this causes the relative pressure in the base chamber 9 to be higher than the surrounding atmospheric pressure of the mine 200. This pressure differential forces the member body 12 out of the base chamber 9 and the support member 11 towards the extended configuration 23 as shown in FIG. 5. In the single stage example, the support member 12 may be solid, or have a solid lower portion such that the support member 12 acts as a piston inside a cylinder formed by the base chamber 9.

Multi Stage Support Member

Figure 6:
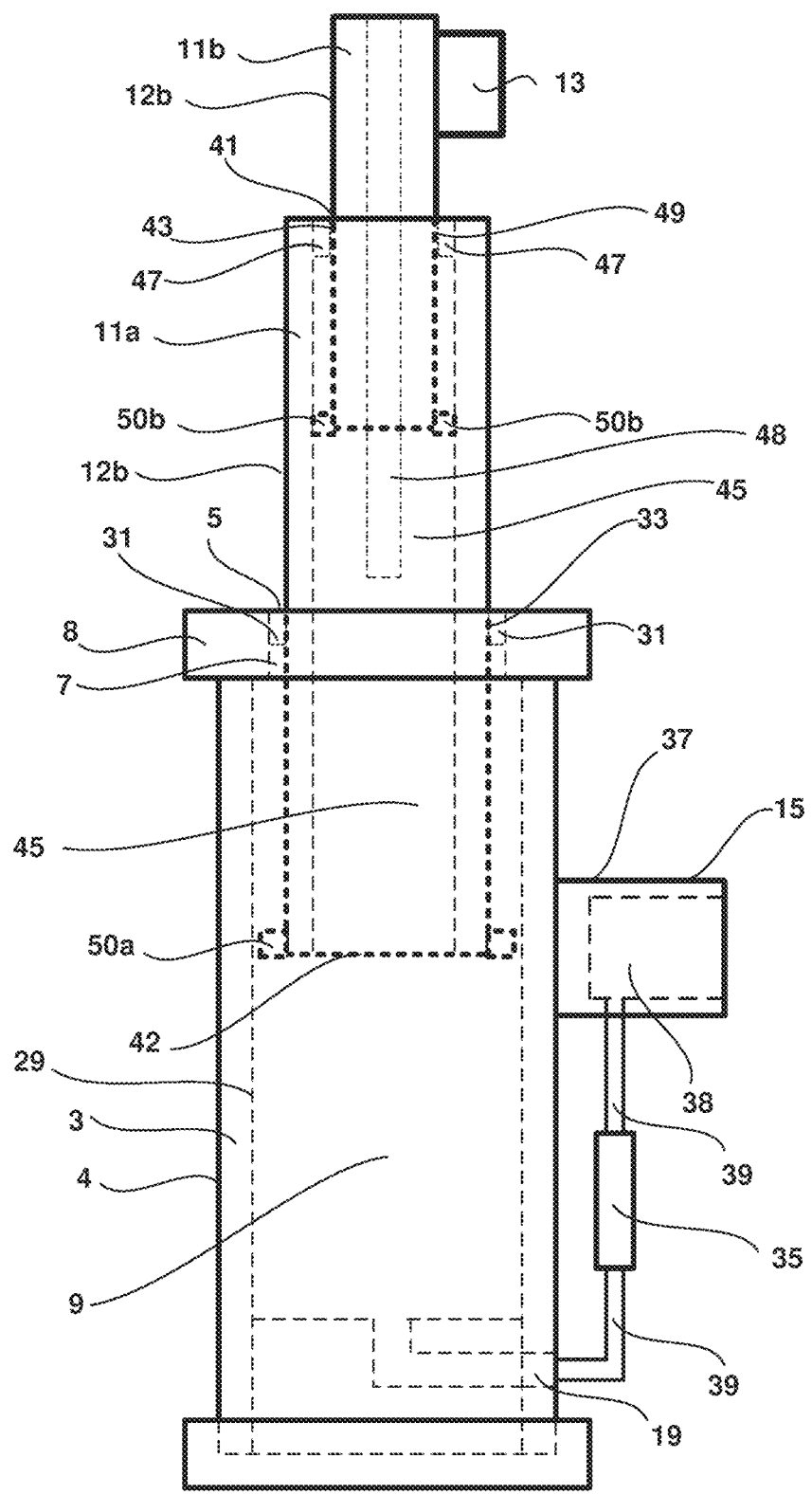
FIG. 6 is a side view of another example of an apparatus to support an explosive device where the apparatus has two telescoping support members.

A multi stage example will now be described with reference to FIG. 6. FIG. 6 illustrates an example with two stages (in addition to the base member 3) but it is to be appreciated further stages, such as three, four, five or more stages could be used based on the same principles.

A first support member 11a, (which could be considered a first stage), includes a tube-like first support member body 12a, that is telescopically receivable into the base chamber 9. In a simplified form, the first support member 11a may include a tube that has a first support chamber 45 within the tube and open apertures at both opposite ends. At one end of the first support member body 12a is a first support aperture 41 to provide a passage 43 to the first support chamber 45. At the opposite end of the first support member body 12a is a fluid connection aperture 42, wherein the fluid connection aperture 42 fluidly connects the first support chamber 45 to the base chamber 9. This allows pressurised fluid flowing into the base chamber 9 to also flow into the first support chamber 45.

A second support member 11b is telescopically receivable through the first support aperture 41 and into the first support chamber 45 of the first support member 11a. The second support member 11b may, in some examples, be a solid cylinder or solid piston rod. In other examples, the second support member 11b may include a tube-like second support member body 12b, but with a plug to prevent pressurised fluid from escaping. For example, a cap may be provided at the top of the second support member body 12b. In an alternative example, a cap may be provided at the bottom of the second support member body 12b to form a piston inside a cylinder formed by the first support chamber 45. It is to be appreciated plugs may be located in other areas, such as in an intermediate area of the second support member body 12b, to prevent or reduce leakage of pressurised fluid.

To prevent or reduce leakage of pressurised fluid out of the first support chamber (and between the overlap of support members 11a, 11b) support seal elements 47 may be provided to form seals 49 between the second support member 11b and a wall 51 of the first support chamber 45.

In some examples, a support rod 48 is provided in the stages (formed by the support members 11, 11a, 11b) to improve stability. Referring to FIG. 6 a support rod 48 is secured to the tube-like second support member body 12b. The support rod 48 extends past a lower aperture of the tube-like second support body 12b and into the first support chamber 45. The support rod 48 may resist bending forces and in particular at the area of overlap between the first and second support member bodies 12a, 12b where the resistance to bending by the support member bodies 12a, 12b is weakest.

An overextension stop 50a, 50b may be provided at the lower portions of the first and second support member bodies 12a, 12b. Referring to FIG. 6, the overextension stop 50a of the first support member body 12a prevents the first support member body 12a from extending beyond the end cap 8. Similar mechanisms and principles can apply to prevent the additional support member bodies 12b, etc. from over extending.

In one example, the base body 4 is approximately 2.4 m long, the first support member 11a is approximately 2 m long, the second support member 11b is approximately 2 m long and the support rod is approximately 2.25 m long. However, it is to be appreciated that other dimensions may be used.

The support members 11, similar to the base member 3, may be formed out of polymers such as PVC pipe. Similarly, the support rod 48 may be made of wood, polymers, or other material that has stiffness to resist bending moments but is of relatively lower hardness that would not damage mining equipment during processing of ore.

Fluid Aperture 19, Fluid Conduit 39 and Valve 35

The fluid aperture 19, illustrated in FIG. 1, passes through the base cap 85 and the base body 4. However it is to be appreciated that the fluid aperture 19 in other alternatives may pass through either one, or an alternative, component of the base member 3 so long as the fluid aperture 19 allows the pressurised fluid to flow into the base chamber 9.

In this example, the pressurised fluid is supplied to the fluid aperture 19 via a fluid conduit 39. The fluid conduit 39 may be a flexible hose, or rigid pipe. In some examples, the fluid conduit 39 is a braided hose. The fluid conduit 39 should have a capacity up to, and preferably exceeding, the expected pressure of the pressurised fluid. In some examples, this may be 100 PSI (pounds per square inch), 150

PSI or 200 PSI. In use, the fluid conduit 39 is fluidly connected to a pressurised fluid source to provide the pressurised fluid into the base chamber 9. The pressurised fluid source will be discussed in further detail below.

A valve 35 may be provided along a flow path of the fluid conduit 39. In some examples, the valve 35 is a one-way (i.e. non-return) valve that allows pressurised fluid to flow past the valve 35 in one direction, but restricts (or prevents) flow in the opposite direction. Preferably, the valve 35 allows pressurised fluid to flow from the pressurised fluid source, through the fluid conduit 39 and into the fluid aperture 19 to the base chamber 9. In some examples, the valve 35 may be selectively operable to allow pressurised fluid to flow in one or both directions. This may facilitate configuring the one or more support members 11 between the retracted 21 and extended 23 configurations, such as during inspection, testing and training.

In the example of FIG. 1, the valve 35 is located at an intermediate location of the flow path of the fluid conduit 39. However, it is to be appreciated that the valve 35 can be provided at other locations and achieve the same function. For example, the valve 35 may be provided at the fluid aperture 19. This may include providing the valve 35 insider the fluid aperture 19, or even in the flow path of the pressurised fluid immediately before or after the fluid aperture 19. In other examples, the valve 35 may be located at the upstream end of the fluid conduit 39, proximal to the connection with the fluid source. In further examples, a relief valve may be provided to vent excessive pressure from the pressurised fluid that is above a safety threshold.

Interface 15

The apparatus 1 further includes an interface 15 at the base member 3 wherein the interface 15 is selectively connectable to an interface head 68 associated with a mining machine 17. This allows the mining machine 17 to manipulate and position the apparatus 1 to a desired location in the mine. Using a mining machine 17 to manipulate the apparatus 1 may be advantageous in the danger zone 83 as the mining machine 17 may provide protection to the operator. In some examples, the mining machine 17 may be remote controlled or autonomous such that operators do not need to be in the danger zone 83.

Figure 7:
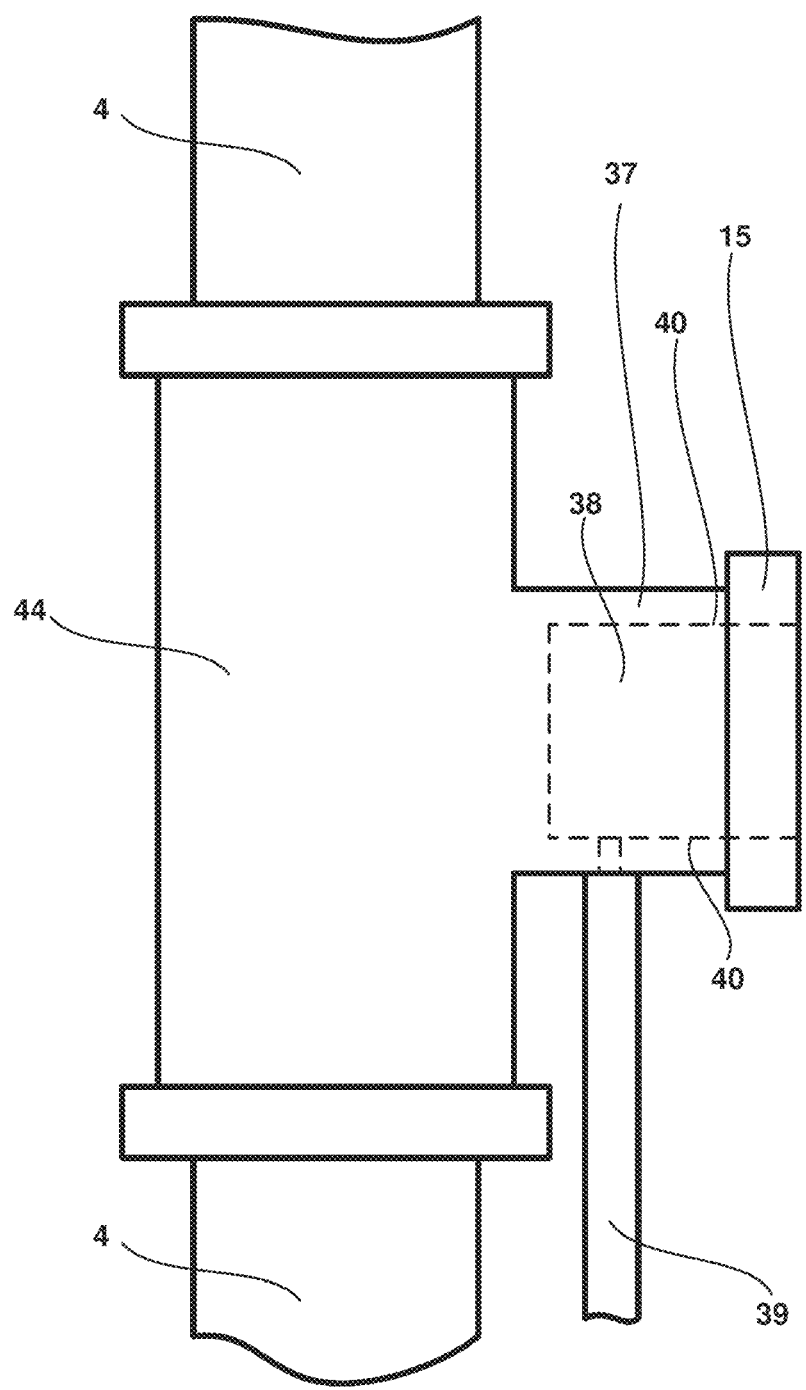
FIG. 7 is a side view of part of an apparatus showing an interface of the apparatus.

In one example, the mechanism to provide the selective connection between the interface 15 and the interface head 68 is a threaded connection. Referring to FIG. 7, the interface includes an extension 37 that extends from a side of the base member 3, with a socket 38 inside the extension. The socket 38 has an internal thread 40 to receive a threaded head 20 of the interface head 68. Therefore for selective connection, the threaded head 20 can rotate in a first direction to engage with the internal thread 40 of the interface 15. Conversely, for selectively disconnection, the threaded head 20 can rotate in an opposite second direction to disengage with the internal thread 40. In some examples, the threaded head 20 and interface head 68 are coupled to a rotary mechanism of the mining machine 17. Since powered rotation is a common output of mining machines 17, such as from a rotating drill, the interface head 68 may be easily adapted to receive rotation from an existing powered rotation output of a mining machine 17 as will be discussed in further detail below.

It is to be appreciated that in other examples, the interface 15 and interface head 86 may be selectively connectable by other means. In one example, the interface 15 and interface head 86 may be selectively connected by a bayonet mount, whereby a female side has a socket with receiving slots and the male side has a spigot with radially extending pins to be received in the slots. The connection may include other fastening means, such as selectively releasable clips, locking lugs, etc.

The interface 15, like the base member 3 and support member 11, may be constructed with material that is relatively soft compared to teeth of mining machinery such that fragments of the interface 15 do not damage mining machinery as the ore is processed. This may include an interface 15 constructed of polymer such as PVC. In one example, at least part of the interface 15 is formed with a "tee" (or "T") pipe fitting 44 as illustrated in FIG. 7. In this example, the tube-like base body 4 passes through the coaxial apertures of the tee and glued (or otherwise fastened) in place. The perpendicular extension of the tee then forms the extension 37 of the interface 15.

The interface 15 may also be fluidly connected to the fluid conduit 39 such that the pressurised fluid can be provided at the interface 15, which subsequently flows through the fluid conduit 39 to the fluid aperture 19 and into the base chamber 9. This may be advantageous in examples where pressurised fluid can be provided by the mining machine 17 through the interface head 68. Referring to FIG. 7, the fluid conduit 39 is fluidly connected to the socket 38. Therefore after the threaded head 20 is threaded to the internal thread 40 of the socket 38, the threaded head 20 may provide pressurised fluid into the socket 38 that in turn flows from the socket 38 and into the fluid conduit 39. The combination of the internal thread 40 and the threaded head 20 may assist in sealing the socket 38 such that pressurised fluid is inhibited from flowing out of the socket 38. It is to be appreciated that in some examples, gasket seals may be provided inside the socket 38 or externally (between the interface 15 and the interface head 68) to inhibit leakage of pressurised fluid such that the pressure of the pressurised fluid is sufficient to flow force the support members towards the extended configuration.

Adaptor 61 with an Interface Head 68

An example of an adaptor 61 with an interface head 68 for selectively connecting to the apparatus 1 will now be described with reference to an example illustrated in FIG. 8. The adaptor includes an elongated body 63 with a first end 67 and an opposite second end 69. At the first end 67 is a machine coupler 65 to allow the adaptor 61 to be coupled with the mining machine 17. At the second end 69 is the interface head 68 for selective connection with the interface 15 of the apparatus 1.

In some examples, the machine coupler 65 may be configured to couple with existing coupling systems of the mining machine 17. For example, the mining machine 17 may include coupling system to mount a drill steel (e.g. drill rods, drill bits bit) of a drill. Therefore the machine coupler 65 may allow the adaptor 61 to be coupled to the mining machine 17 with ease and/or without substantial modification to the mining machine 17.

The adaptor 61 further includes a pressurised fluid passage 71 to allow a flow of pressurised fluid from the machine coupler 65 (which is coupled to the mining machine 17) to an outlet 73 at the interface head 68. This allows the mining machine 17 to supply pressurised fluid into the machine coupler 65, through the fluid passage 71 of the adaptor 61, and through the outlet 73 into the socket 38 of the interface 15. This pressurised fluid then flows to at least the base chamber 9 as discussed above to force the support members towards the extended configuration.

The pressurised fluid passage 71 may be along a central axis of the elongated body 63. In some examples, mining machines may have hardware to supply pressurised fluid such as compressed air, water, drilling fluid, or other gasses and liquids. Thus in one particular example, such existing hardware may be used to supply the pressurised fluid to the base chamber 9.

In some examples, the elongated body 63 is a rigid member that is made with a material of high stiffness to resist bending from the weight of the apparatus 1 and explosive device 13. A rigid member may also assist in accurate control and positioning of the apparatus 1. Since the adaptor 61 and mining machine 17 are typically withdrawn from the danger zone 83 before detonation of the explosive device 13, the elongated body may be made of hard materials such as steel, iron, aluminium, other metals and alloys. The elongated body 63 may include a metal rod with one or more pressurised fluid passages 71 along the lengthwise axis.

In one variation of the adaptor 61, the elongated body 63 may include a rigid portion connected to a flexible portion. The rigid portion provides the stiffness to support and accurately place the connected apparatus 1 and the flexible portion may allow a degree of flexibility and compliance when placing the apparatus 1 on an uneven first surface 81.

Figure 8:
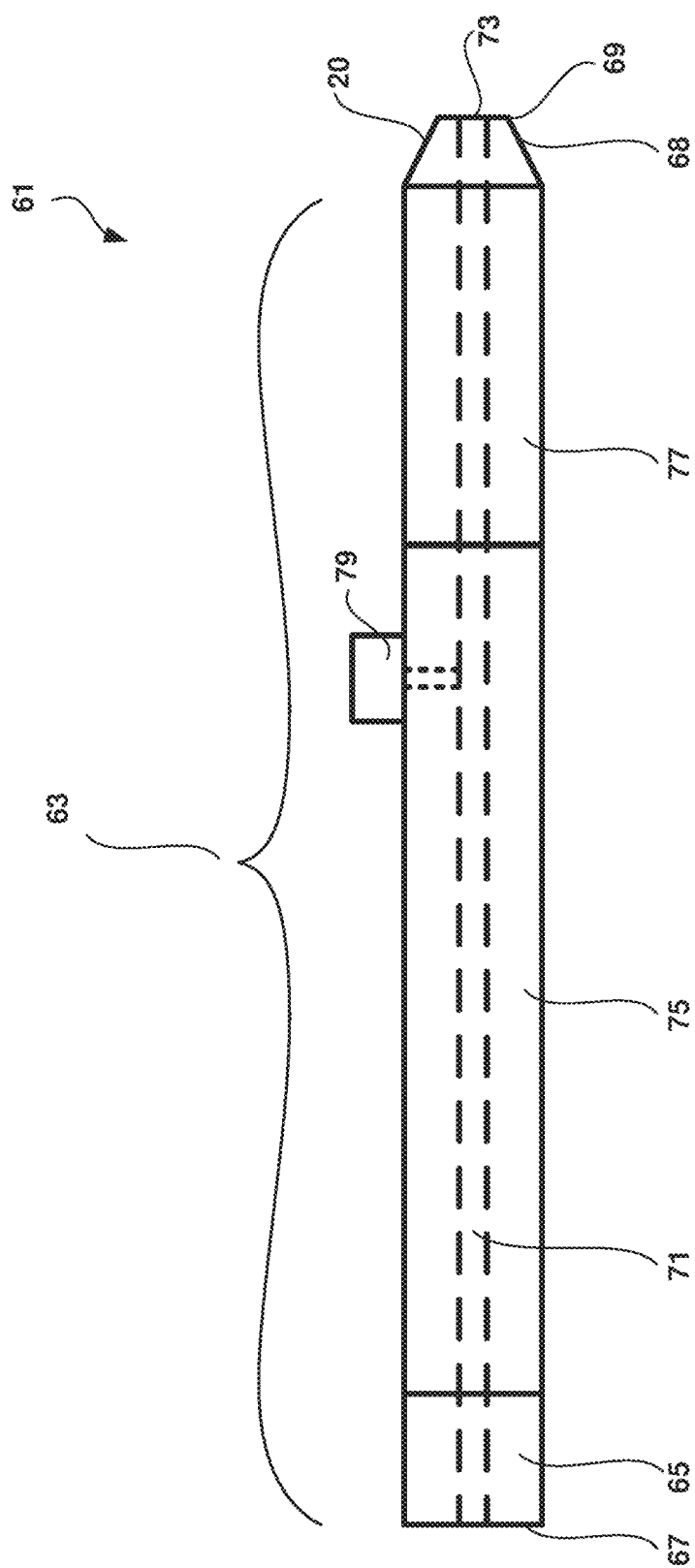
FIG. 8 is a side view of an adaptor to connect the apparatus to a mining machine.
Figure 9:
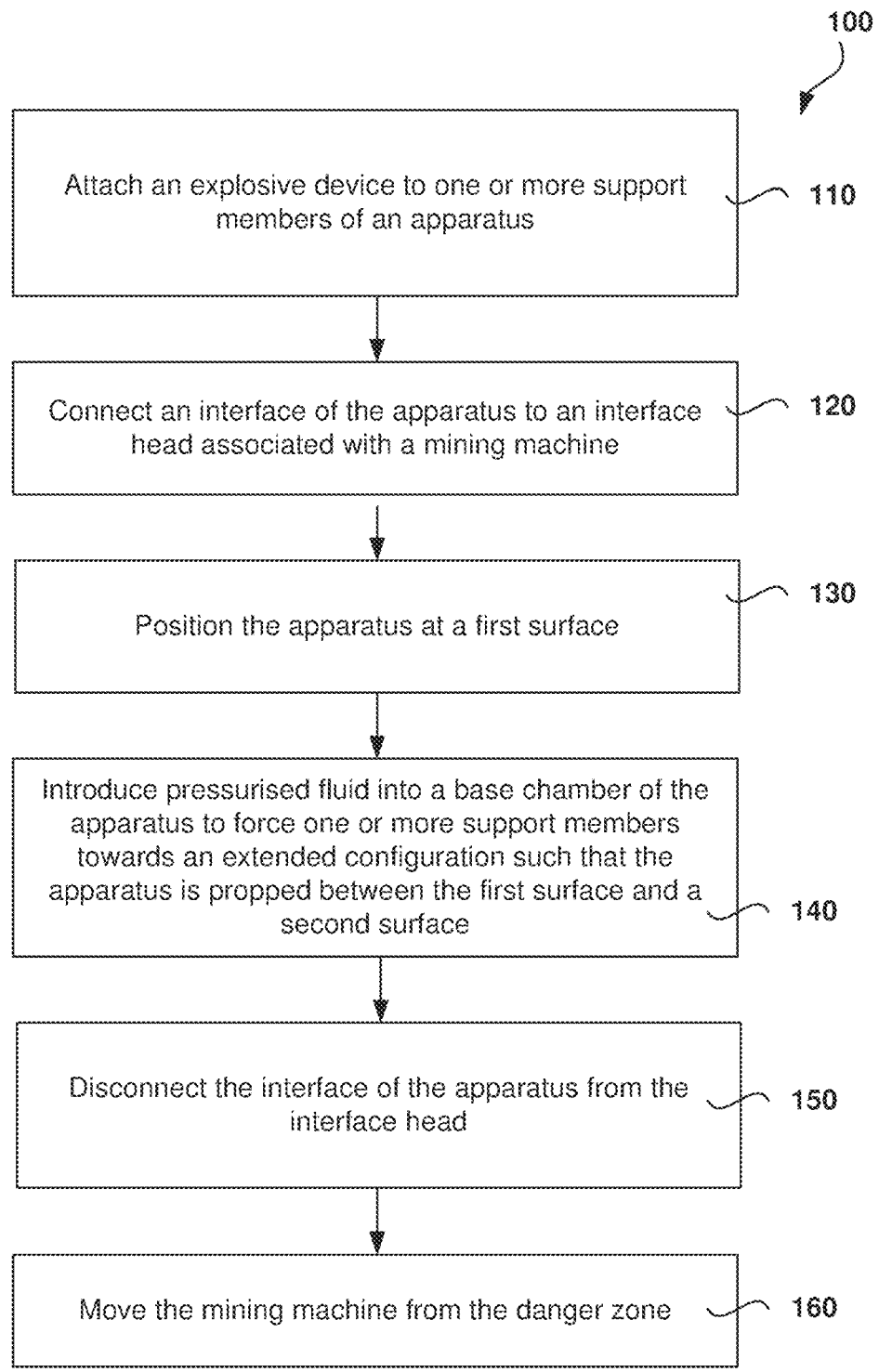
FIG. 9 is a flow diagram of a method of positioning an explosive device with the apparatus.

Referring to FIG. 8, the rigid portion may include a rigid hollow rod section 75 starting from the first end 67 of the adaptor 1. The flexible portion in the form of a flexible hollow section 77 may extend from the rigid hollow rod section 75, whereby the flexible hollow section 77 is proximal to the second end 69. The hollow of each of the sections 75, 77 form the pressurised fluid passage 75. In some further examples, the flexible hollow section 77 and the rigid hollow rod section 75 may be selectively attached and detached from each other for inspection, maintenance or replacement of worn components.

In a further example, a pressure release valve 79 may be associated with the pressurised fluid passage 71. The pressure release valve 79 may be configured to vent the pressurised fluid passage 71 upon excessive pressure, such as a specified safety pressure. This may prevent damage to components such as the mining machine 17, adaptor 61, or apparatus 1.

Mining Machine 17

The mining machine 17 may include an underground mining machine. This may include a drilling rig. It is to be appreciated that various underground mining machines may be used, such as secondary breaking drill rigs, drilling jumbos, telescopic handler (telehandler), tele-remote rigs etc.

In one example, a mining machine 17 may include an articulating arm or boom that can be directed to a desired position. In some examples, the articulating arm may be designed to position and operate a drill. The above described adaptor 61 may be coupled to the articulating arm in place of where a drill steel (drill rod) would otherwise be located.

The mining machine 17 may be operated by an operator at the mining machine 17 itself. In other examples, the mining machine 17 may be remotely operated by the operator, which may be advantageous in dangerous areas of the mine 200. It is to be appreciated that the mining machine 17 may also have one or more functions that are automated and controlled by a computer.

The mining machine 17 may also provide pressurised fluid. In some examples, the pressurised fluid may be air or water at 100 PSI. This may include providing compressed air (or other gasses) from an air compressor or gas tank. In other examples the pressurised fluid may be a liquid such as water. Drilling operations may require water (or other drilling fluid) to be provided to control temperature and flush out debris. Therefore the mining machine may have existing hardware (such as pumps and reservoirs) to provide a pressurised fluid, that can be adapted to supply the pressurised fluid to the apparatus. In yet another alternative, the pressurised fluid may be provided from a hydraulic system of the mining machine 17.

Method of Operation 100

A method 100 to position an explosive device 13 using the apparatus 1 will now be described with reference to FIG. 9 and FIGS. 10a to 10f. The method 100 may be of particular use for a secondary break to break up hung up rock or ore. Typically, such rock will be an overhead surface (such as second surface 82 in an underground mine 200.

Figure 10A:
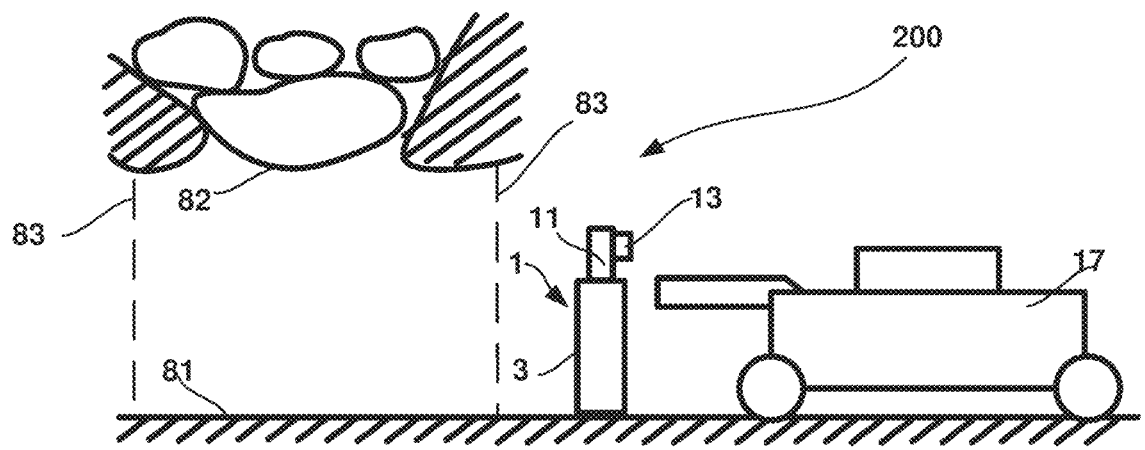
FIGS. 10a to 10f illustrate a sequence of the method of positioning an explosive device.

Firstly, the explosive device 13 is attached 110 to the one or more support member 11 of the apparatus as shown in FIG. 10a. For maximum effect, it may be desirable to place the explosive device 13 as close to the second surface 82 as possible. Therefore the explosive device 13 may be provided at, or close to, the upper portion of the one or more support members 11.

The one or more support members 11 may initially be in a retracted configuration such that the upper portion of the support member 11 is easier to access by an operator when attaching the explosive device 13 and to aid handling in the confined spaces of an underground mine 200.

In some examples, pressure sensitive tape may be used to attach the explosive device 13 to the support member 11. Advantageously, pressure sensitive tape is normally is typically constructed with flexible materials, such as fabric, cellulose, or polymers that are soft. Such materials are less likely to fragment to dangerous projectiles in the explosion nor likely to damage equipment when the ore is processed. However it is to be appreciated that other fastening means may be used to attach the explosive device 13 to the support members, such as mechanical fasteners including clips, as well as providing a bracket, basket or compartment at the support member 11 to house the explosive device.

Figure 10B:
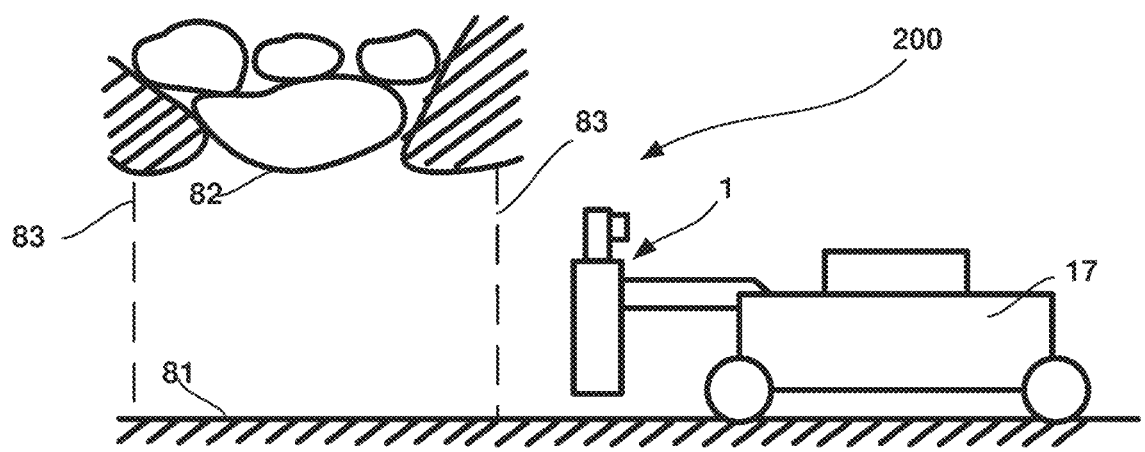

The method 100 further includes connecting 120 the apparatus 1 to the mining machine 17 as shown in FIG. 10b. This may involve connecting the interface 15 to the interface head 68 that is connected to a movable arm of the mining machine 17. In some examples, this may include rotating the threaded head 20 so that the threaded head 20 is engaged with the internal thread 40. It is to be appreciated that the step of attaching 110 the explosive device 13 may be performed after the step of connection 120 the apparatus 1 to the mining machine 17.

Figure 10C:
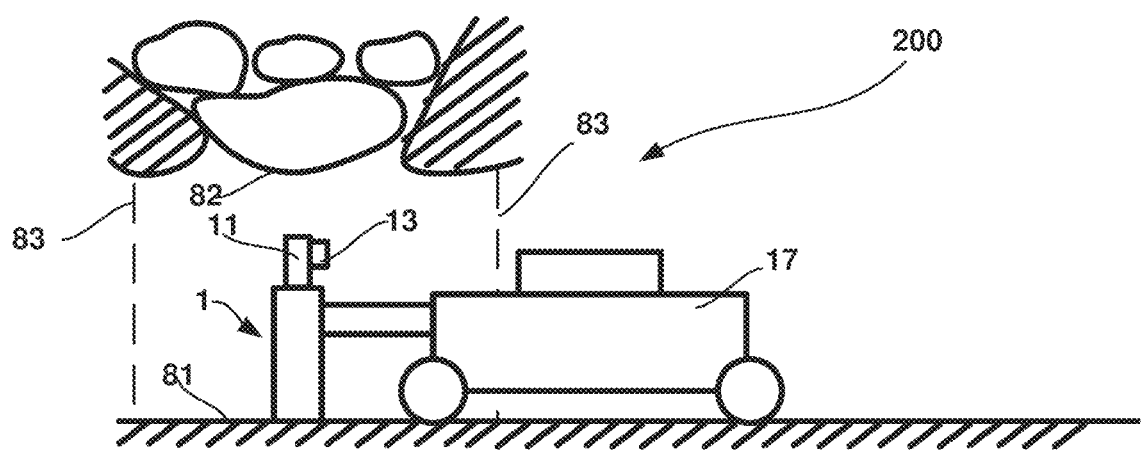

The next step is to position 130 the apparatus 1, with the one or more support members 11 in a retracted configuration 21, at the first surface 81 as shown in FIG. 10c. This may involve moving the mining machine 17 to the vicinity of the danger zone 83, and then manipulating interface head 68 of the mining machine 17 to position the apparatus 1 at the desired position at the first surface 81.

Figure 10D:
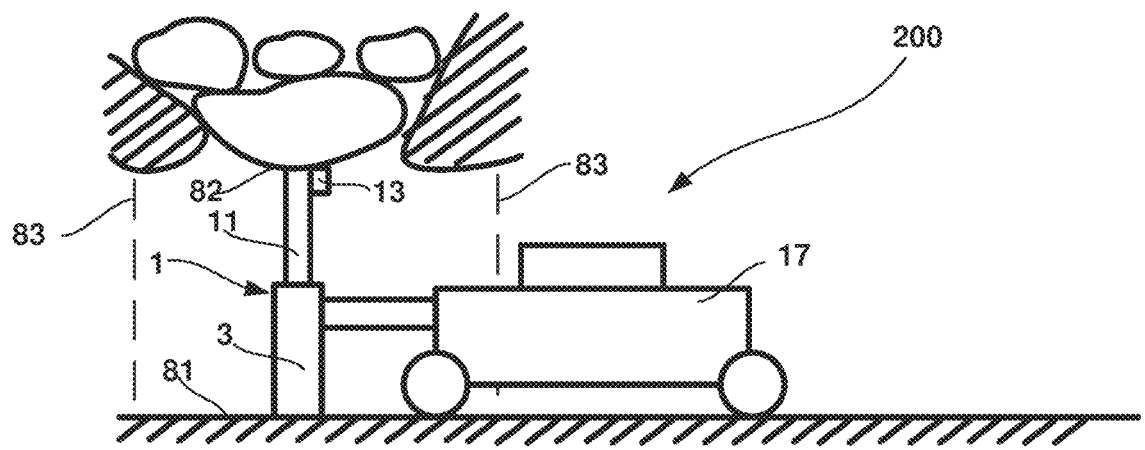

The next step is to introduce 140 pressurised fluid into the base chamber 9 of the apparatus 1 to force the one or more support members 11 towards an extended configuration 23 such that the one or more support members 11 extend towards the second surface 82 and so that the apparatus 1 is propped between the first surface 81 and the second surface 82. This secures the apparatus 1 in place as shown in FIG. 10*d*. This also positions the explosive device 13, supported by the support members 11, to be proximal to the second surface 82.

Figure 10E:
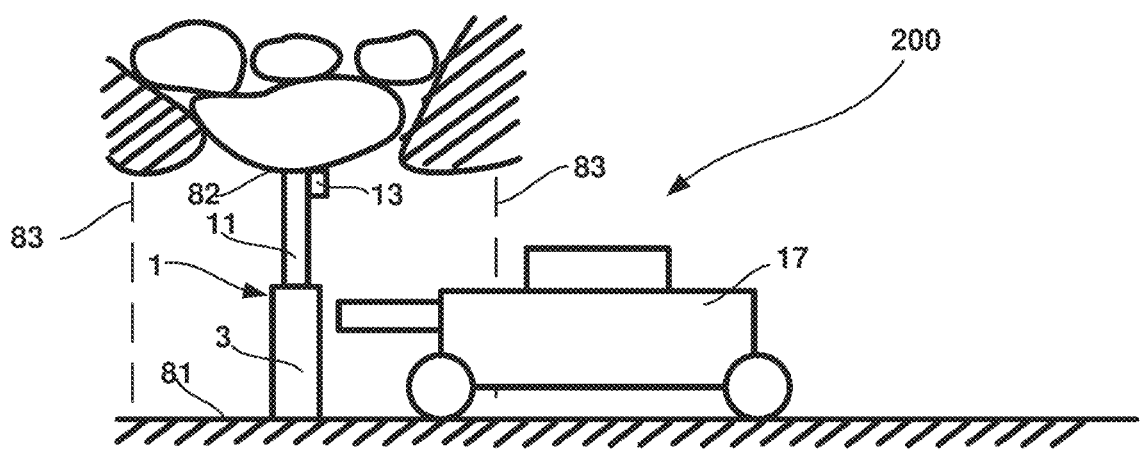

The method 100 may further include disconnecting 150 the interface 15 of the apparatus 1 from the interface head 68 associated with the mining machine 17 as shown in FIG. 10*e*. In one example, this includes rotating the threaded head 20 such that it is threaded out of the internal thread 40 of the interface 15.

Figure 10F:
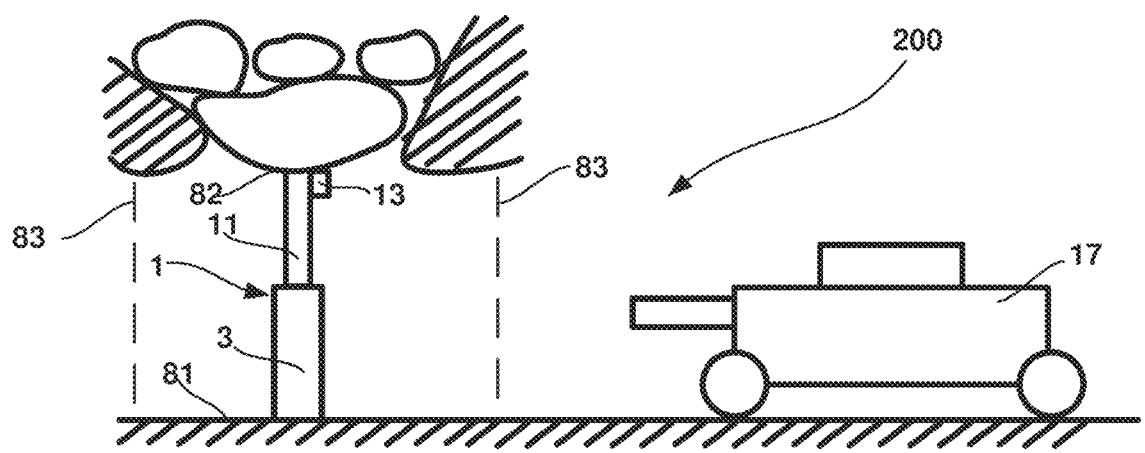
Figure 11:
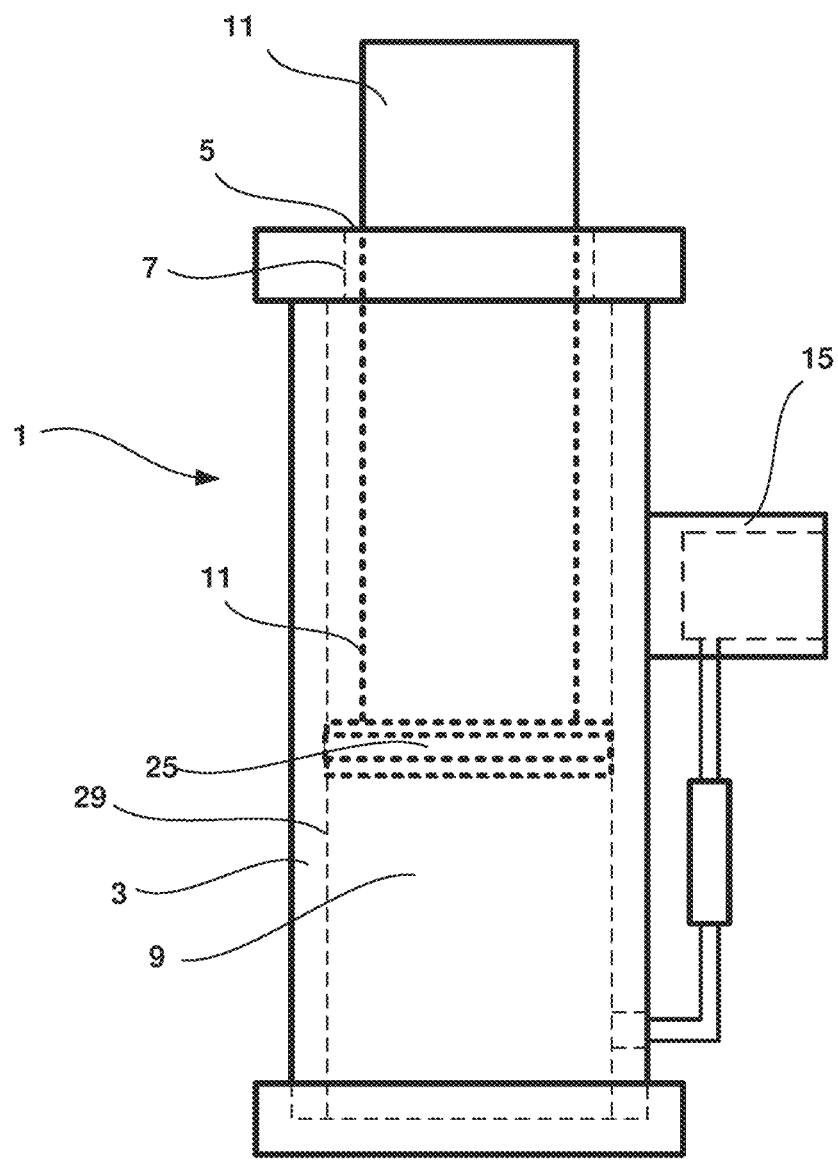
FIG. 11 illustrates another example of the apparatus having a piston ring seal between the support member and a base chamber of the apparatus.

The method 100 further includes moving the mining machine 17 from the danger zone 83 as shown in FIG. 10*f*. Once the mining machine 17 and personnel are in a safe area, the explosive device 13 may be detonated to break up and dislodge rock and ore that is around the second surface 82.

Variations

The illustrated examples show the apparatus 1 with one or two support members 11. However, it is to be appreciated additional support members could be implemented in the apparatus 1 as required. For example, in applications where the distance between the first and second surface 81, 82 is greater, this may require additional support members 11.

In some variations (and with reference to FIG. 11), the sealing element 25 that seals the one or more support members 11 to one another and/or the base member 3 may include one or more piston rings 25. The piston rings 23 are associated with the support members 11 to form a seal 27 between the at least one support member 11 and a wall 29 of the base chamber 9.

Figure 12:
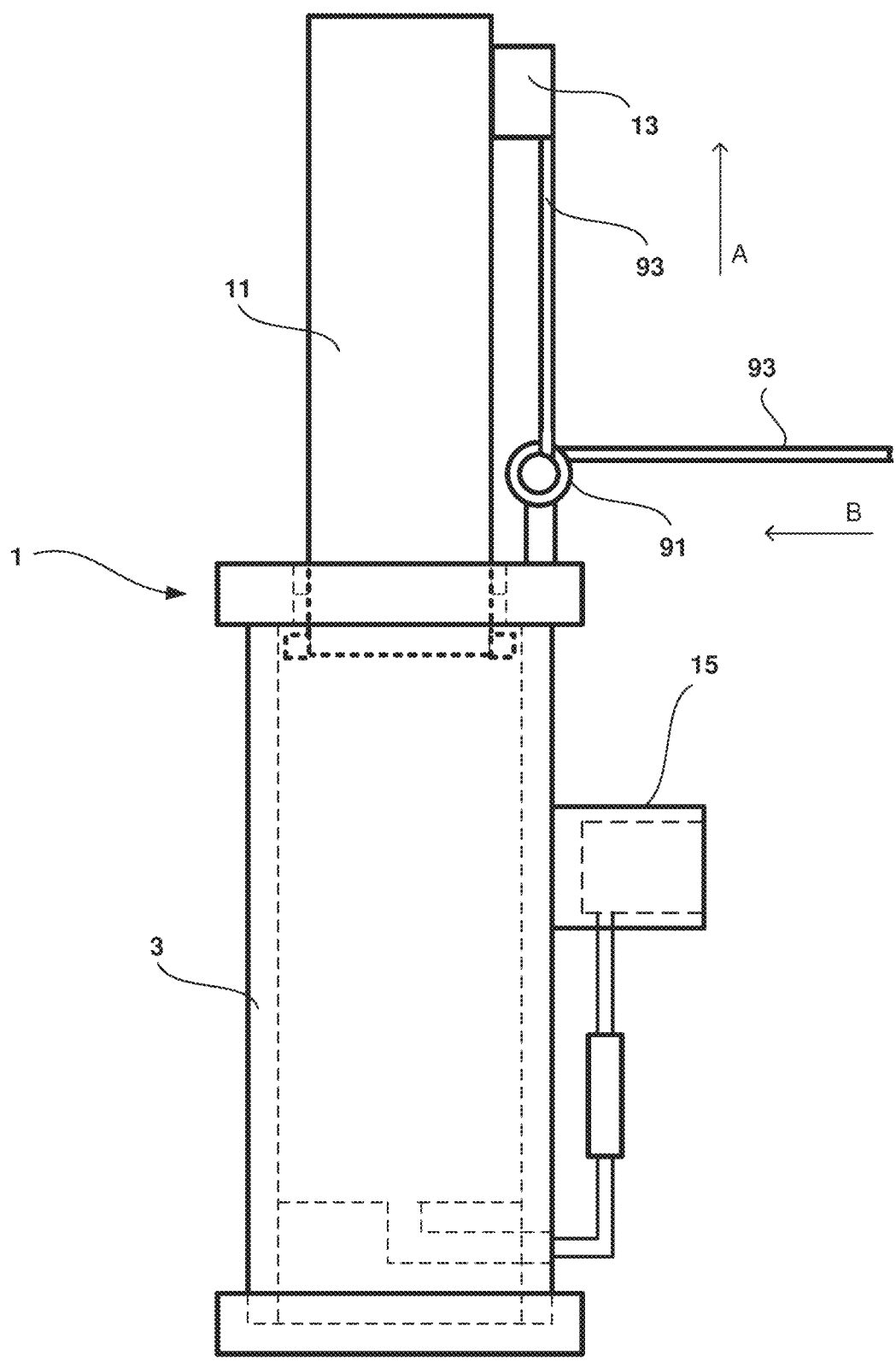
FIG. 12 illustrates another example of the apparatus with a guide for guiding a wire to the explosive device.

Referring to FIG. 12, the apparatus 1 may further include a guide 91 at the base member 3 to guide a wire 93 that provides a control signal to the explosive device 13. The guide 91 may include a loop or other guiding surface to assist in smooth redirection of the wire 93. In particular, when the support members 11 are extended, the moving explosive device 13 will pull on the wire (in a general upward direction A as shown in FIG. 12). In turn, the wire may be pulled horizontally (in a general horizontal direction B as shown in FIG. 12). The guide 91 may also reduce the chances of the wire snagging on other objects in the mine. This may be important as a snagged wire may pull the explosive device 13 away from the support member 11 and/or pull a detonator from the explosive device 13. It is to be appreciated that the wire 93 can be an electrical wire or in other examples, detonating cord.

Figure 13:
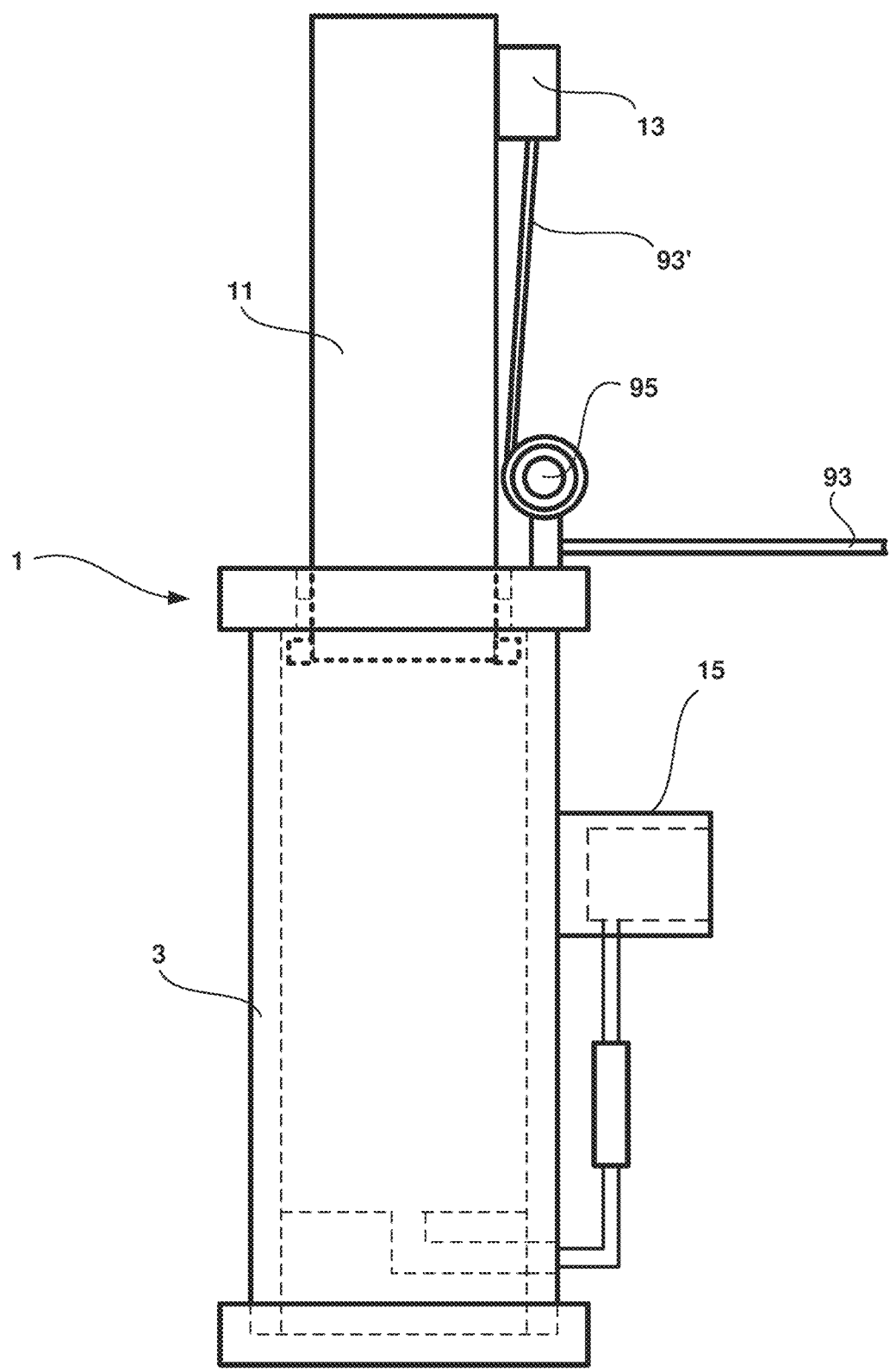
FIG. 13 illustrates another example of the apparatus with a wire spool to provide wire to the explosive device.

FIG. 13 illustrates another example, where a wire spool 95 is provided at the base member 3. The wire spool 95 may unwind to release wire 93' as the support member 11 is extended.

Figure 14:
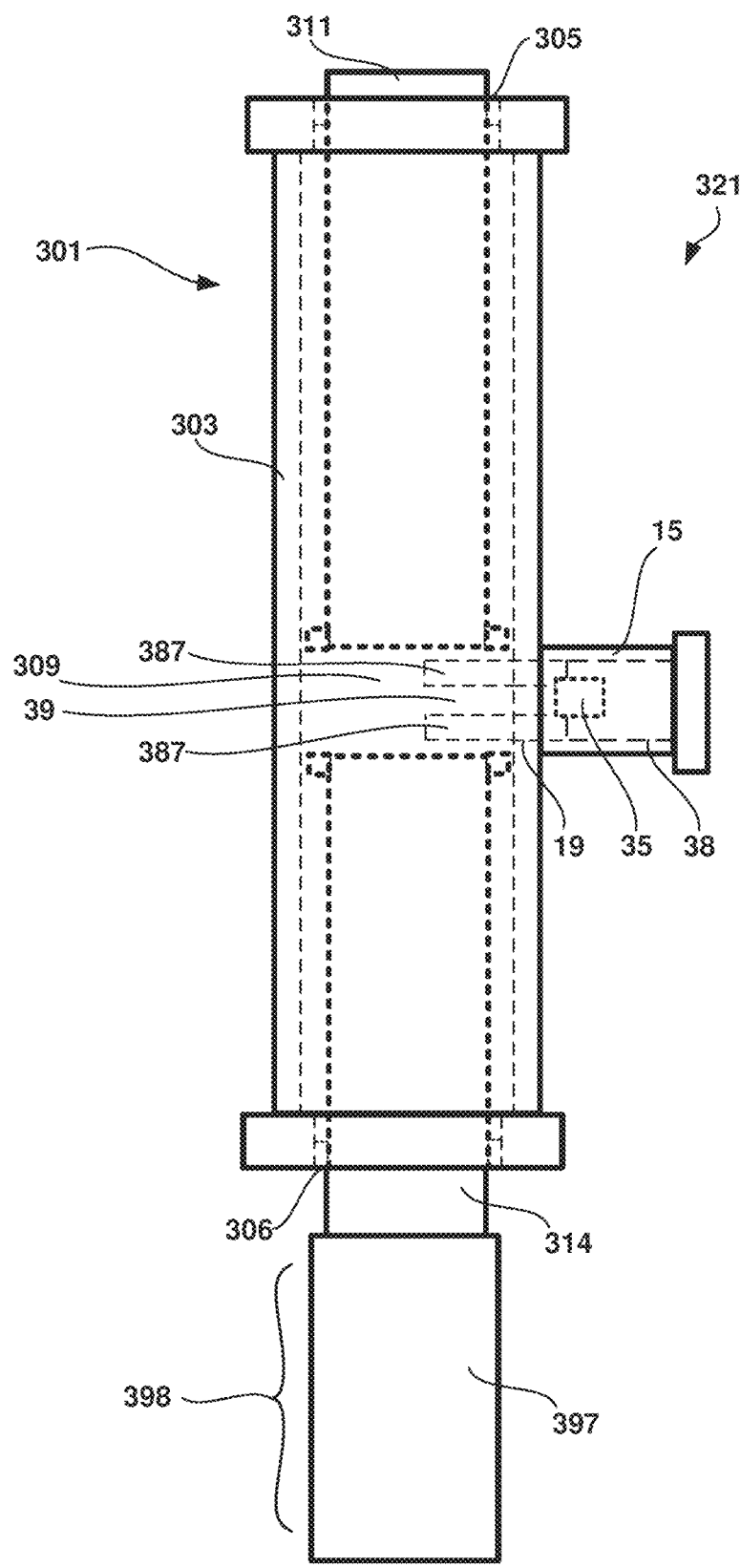
FIG. 14 illustrates another example of the apparatus that includes two members extendible in opposite directions.
Figure 15:
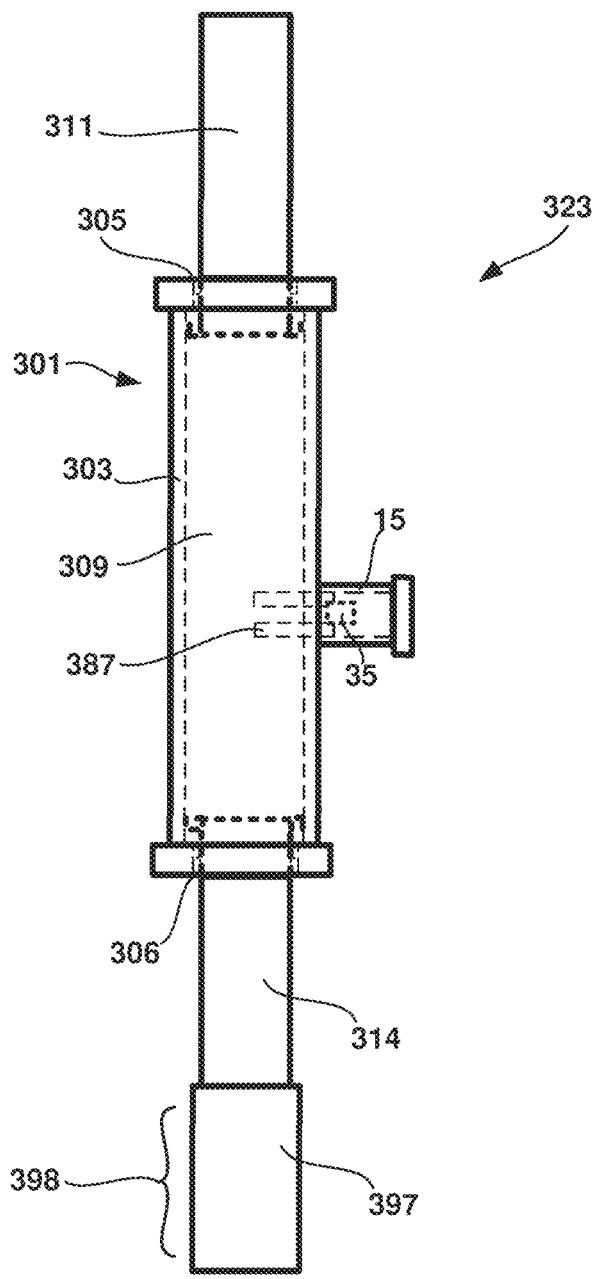
FIG. 15 illustrates the apparatus of FIG. 14 in the extended configuration.

FIGS. 14 and 15 illustrate yet another example of an apparatus 301 that has members 311, 314 that can extend from the base member 303 in opposite directions. The base member 303 has a chamber 309 and two base member apertures 305, 306. In this example, the base member apertures 305, 306 are at opposite ends to the base 303. The first base member aperture 305 receives one or more support members 311 and, similar to the examples above, can support an explosive device 13 (not shown). One or more additional members 314 are telescopically receivable into the base chamber 309 through the second base member aperture 306.

A valve 35 may be provided along a flow path to allow pressurised fluid to flow past the valve 35 in one direction and into the base chamber 309 and to prevent the pressurised fluid from flowing out of the valve 35 in the opposite direction.

When pressurised fluid is introduced into the base chamber 309, the pressurised fluid forces the support members 311 from a retracted configuration 21 (as illustrated in FIG. 14) to an extended configuration 23 (as illustrated in FIG. 15). In addition, the pressurised fluid also forces the additional members 314 from the retracted configuration 321 to the extended configuration 323. As shown in FIG. 15, the support members 311 and additional members 314 extend in opposite directions.

In some examples, a bump stop 387 is provided to prevent the support member 311 or additional support member 314 from over retracted. That is, to prevent the members 311, 314 from blocking the pressurised fluid from flowing through the fluid aperture 19 and into the base chamber 309. In some examples, the bump stop 387 is an insert through socket 38 and the fluid aperture 19, wherein the insert includes the fluid conduit 39 to allow pressurised fluid into the base chamber 309. The insert may also support the valve 35.

Figure 16A:
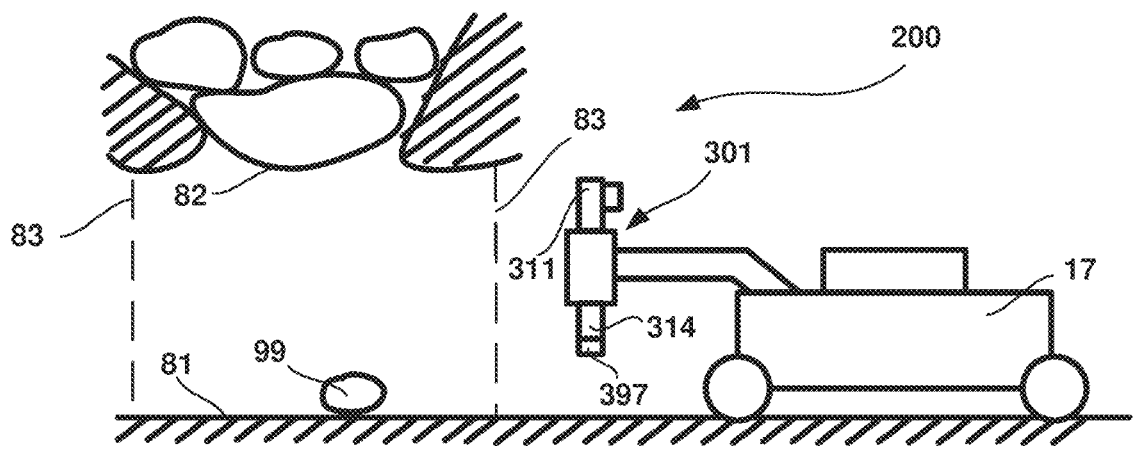
FIGS. 16a and 16b illustrate a sequence of positioning an explosive device with the apparatus in FIGS. 14 and 15.
Figure 16B:
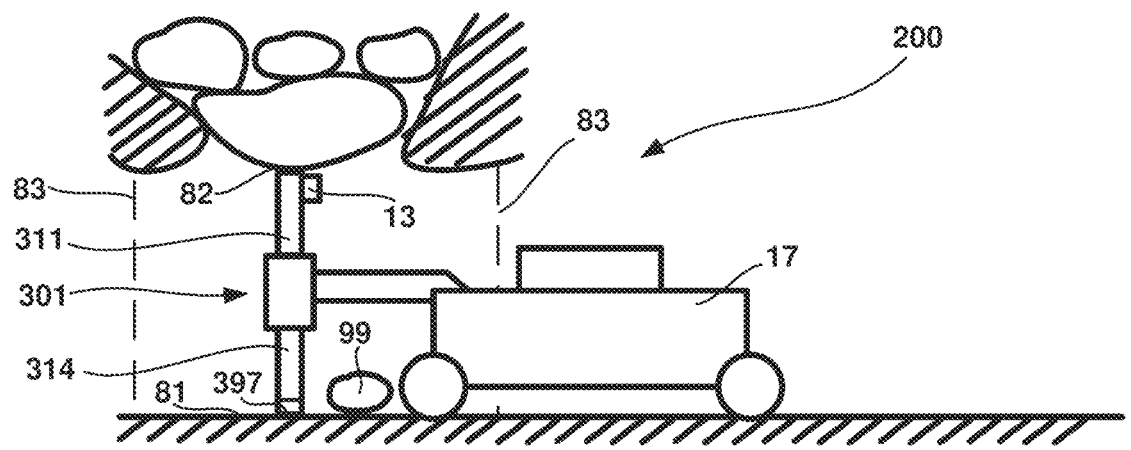

An advantage of having members 311 and 314 extending in opposite directions is that it may make positioning the explosive device 13 easier in some circumstances. Referring to FIGS. 16*a* and 16*b*, the mine 200 is illustrated to have an obstruction 99 on the first surface 81. In some examples, this obstruction 99 may be rock, berm, or embankment that hinders clear access to the area between the first surface 81 and second surface 82. By having the additional member 314 that can be in a retracted configuration, as shown in FIG. 16*a*, this may allow mining machine 17 to more easily move the apparatus 301 over and past the obstruction 99. After this, the support members 311 and additional members 314 can then be extended so that the apparatus 301 is propped between the surfaces 81, 82.

Another advantage of having the base between members 311 and 314 may include raising the base member 303 and the wire 93 (see example of wire in FIGS. 12 and 13) at a higher level from the surface 81. This may reduce snagging or trip hazards with the wire 93.

The apparatus 301 in some examples also includes an extension 397 as shown in FIGS. 14 to 16*b*. The extension 397 includes a structurally weak section 398. The extension is not directly pressurised by the pressurised fluid introduced into the base chamber 9. In some examples, the structurally weak section 398 may include a hollow chamber whereby chamber walls of the structurally weak section 398 may bend, buckle, deform or crack. The extension (such as the hollow chamber) is not directly pressurised by the pressurised fluid introduced into the base chamber 9 In some examples, the chamber walls may be constructed of polymer. In other examples, the structurally weak section 398 may be made of a resilient material such as natural or synthetic rubber. In yet other examples, the structurally weak section 398 may be made of a compressible and resilient material such as open-cell or closed-cell foam structures.

The extension 397 is advantageously positioned at either or both ends of the apparatus 1, 301. In examples of the apparatus 1 that have a base member 3 and support member 11, the extension 397 may be attached to an end of the base member 3 such that the extension is between the first surface 81 and the base member 3. In other examples, the extension 397 may be attached to an end of the support member 11, 311 or the additional member 314 such that the extension 397 is between the members 11, 311, 314 and surfaces 81, 82.

The extension 397 may be designed such that it is structurally weaker relative to the base 3, support members 311 and additional members 314 (if present). This may be advantageous to prevent or reduce damage to the base member 3, 303, support members 11, 311, and additional members 314 if there is excessive pressure from the pressurised fluid in the base chamber 9, 309. For example after the pressurised fluid has extended the members 11, 311, 314 so that when the apparatus 1 is propped between surface 81, 82, if additional pressurised fluid is forced into the base chamber 9, 309 (and without pressure relief) this may cause the fluid to damage components defining the base chamber 9. In examples where the base member 3, 303, support member 11, 311 and additional members 314 are polymer pipes, this may include cracking and leakage of the pressurised fluid. This may cause the apparatus 1, 301 to be less effective in staying propped in the location between surfaces 81, 82.

Thus the extension 397 may be considered as a sacrificial member so that on excess pressure, the extension 397 can compress (which may include compression of the resilient material or structure, bending, buckling, etc. of the structurally weak section 398). The compression of the extension 397 before structural failure of the base member 3, 303, support member 11, 311 or additional member 314 may prevent or reduce damage to the apparatus during positioning of the apparatus 1 and explosive device 13.

In some examples, if the extension 397 is damaged during positioning, the apparatus may be recovered and the extension 397 replaced. In other examples, the extension 397 may be designed to allow some deformation and remain serviceable.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An apparatus for supporting an explosive device between a first surface and a second surface, the apparatus comprising:
   a base member comprising a base member aperture to provide a passage to a base chamber of the base member;
   one or more support members telescopically receivable through the base member aperture and into the base chamber, wherein the one or more support members support the explosive device;
   a fluid aperture to allow pressurised fluid into the base chamber to force the one or more support members towards an extended configuration such that at least part of the one or more support members are telescopically extended out of the base chamber, such that the one or more support members, with the explosive device, extend towards the second surface such that the apparatus is propped between the first surface and the second surface, and wherein the explosive device supported by the one or more support members is positioned proximal to the second surface;
   a sealing element, wherein the sealing element forms a first seal between at least one of the support members and a wall of the base chamber to prevent or reduce leakage of pressurised fluid out of the base chamber;
   a valve associated with the fluid aperture, wherein the valve is configurable to inhibit flow of pressurised fluid out of the base chamber via the fluid aperture; and
   an interface at the base member, wherein the interface is selectively connectable to an interface head associated with a mining machine.

2. The apparatus of claim 1, wherein the sealing element comprises a piston ring associated with at least one of the support members to form the first seal between the at least one support member and the wall of the base chamber.

3. The apparatus of claim 1, wherein the interface comprises an extension having a socket with an internal thread to receive a threaded head of the interface head.

4. The apparatus of claim 1, further comprising a fluid conduit to provide a fluid flow path between the fluid aperture and the interface, wherein pressurised fluid is introduced to the base chamber via the interface and fluid conduit.

5. The apparatus of claim 4, wherein the fluid conduit provides the fluid flow path to the socket of the interface.

6. The apparatus of claim 1, further comprising a valve associated with the fluid aperture, wherein the valve is configurable to inhibit flow of pressurised fluid out of the base chamber via the fluid aperture, and wherein the valve is provided in the flow path between the interface and the fluid aperture.

7. An adaptor for connecting a mining machine to an apparatus, the adaptor comprising:
   an elongated body having a machine coupler at a first end for coupling with the mining machine and the interface head at an opposite second end, wherein the interface head is selectively connectable to the interface of the apparatus according to claim 6; and
   a pressurised fluid passage to allow a flow of pressurised fluid from the machine coupler to an outlet at the interface head, to provide a flow of pressurised fluid to the interface of the connected apparatus.

8. The adaptor of claim 7, wherein the interface head comprises a threaded head.

9. The adaptor of claim 7, wherein the elongated body comprises:
   a rigid hollow rod section; and
   a flexible hollow section extending from the rigid hollow rod section and proximal to the second end,
   wherein at least part of the pressurised fluid passage is formed in the rigid hollow rod section and the flexible hollow section.

10. The adaptor of claim 7, further comprising a pressure release valve associated with the pressurised fluid passage, wherein the pressure release valve is configured to vent the pressurised fluid passage upon excessive pressure.

11. The apparatus of claim 1, wherein the one or more support members comprises:
   a first support member comprising a first support aperture to provide a passage to a first support chamber of the first support member, wherein the first support chamber is fluidly connected to the base chamber; and
   a second support member telescopically receivable through the first support aperture and into the first support chamber,
   wherein the fluid aperture allows pressurised fluid into the base chamber and the first support chamber to force the first and second support members towards the extended configuration such that at least part of the second support member is telescopically extended out of the first support chamber and at least part of the first support member is telescopically extended out of the base chamber.

12. The apparatus of claim 11, further comprising a support seal element, wherein the support seal element forms a second seal between the second support member and a wall of the first support chamber to prevent or reduce leakage of pressurised fluid out of the first support chamber.

13. The apparatus of claim 1, wherein one or more of the support members and the base members comprise one or more tubular members.

14. The apparatus of claim 1, wherein one or more of the support members and the base members are polymer members.

15. The apparatus of claim 1, further comprising one or more additional members, wherein the additional members are telescopically receivable into the base chamber through a second base member aperture of the base member, wherein the pressurised fluid into the base chamber forces the one or more additional members towards a second extended configuration.

16. The apparatus of claim 15, wherein the second extended configuration of the one or more additional members is towards a direction opposite to the extended configuration of the one or more support members.

17. The apparatus of claim 1, further comprising an extension, wherein the extension is located at the base member and wherein the extension is structurally weaker that the base or support members such that on excess pressure in the base chamber the extension compresses before structural failure of the base member, or support members.

18. A method of positioning the explosive device between a first surface and a second surface comprising:
   attaching the explosive device to the one or more support members of the apparatus according to claim 1;
   connecting the interface of the apparatus to the interface head associated with the mining machine;
   positioning the apparatus, with the one or more support members in a retracted configuration, at the first surface, wherein the step of positioning the apparatus at the first surface comprises positioning the apparatus with the interface head; and
   introducing pressurised fluid into the base chamber of the apparatus to force the one or more support members towards the extended configuration;
   wherein after the step of introducing pressurised fluid into the base chamber of the apparatus to force the one or more of the support members to an extended configuration, the method comprises:
      disconnecting the interface of the apparatus from the interface head associated with the mining machine; and
      moving the mining machine from a danger zone associated with the explosive device.

\* \* \* \* \*